US012581363B2

(12) United States Patent
Liu et al.

(10) Patent No.: US 12,581,363 B2
(45) Date of Patent: Mar. 17, 2026

(54) METHODS AND APPARATUSES FOR LOAD BALANCE

(71) Applicant: Telefonaktiebolaget LM Ericsson (publ), Stockholm (SE)

(72) Inventors: Chunhui Liu, Beijing (CN); Huaisong Zhu, Beijing (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 922 days.

(21) Appl. No.: 17/627,757

(22) PCT Filed: Jul. 17, 2019

(86) PCT No.: PCT/CN2019/096396
§ 371 (c)(1),
(2) Date: Jan. 17, 2022

(87) PCT Pub. No.: WO2021/007820
PCT Pub. Date: Jan. 21, 2021

(65) Prior Publication Data
US 2022/0272573 A1      Aug. 25, 2022

(51) Int. Cl.
*H04W 28/086* (2023.01)
*H04B 7/06* (2006.01)
(Continued)

(52) U.S. Cl.
CPC .... *H04W 28/0861* (2023.05); *H04B 7/06952* (2023.05); *H04L 45/123* (2013.01);
(Continued)

(58) Field of Classification Search
CPC . H04W 28/0861; H04W 16/04; H04W 40/12; H04B 7/0695; H04B 7/0452; H04L 45/123; H04L 45/124; H04L 47/125
See application file for complete search history.

(56) References Cited

U.S. PATENT DOCUMENTS

| 7,880,151 B2 | 2/2011 | Wells |
| 9,113,335 B2 | 8/2015 | Ponnuswamy |
| | (Continued) | |

FOREIGN PATENT DOCUMENTS

| CN | 104202771 A | 12/2014 |
| CN | 105208603 A | 12/2015 |
| | (Continued) | |

OTHER PUBLICATIONS

3GPP, "3GPP TS 38.101-1 V15.4.0", 3rd Generation Partnership Project; Technical Specification Group Radio Access Network; NR; User Equipment (UE) radio transmission and reception; Part 1: Range 1 Standalone (Release 15), Dec. 2018, 1-230.
(Continued)

*Primary Examiner* — Eric Myers

(74) *Attorney, Agent, or Firm* — Sage Patent Group

(57) ABSTRACT

Methods and apparatuses for load balance are disclosed. According to an embodiment, a first base station determines a first spatial distribution of terminal devices in a first cell of the first base station, based on measurement reports which are received from the terminal devices and comprise beam candidates suitable for serving the terminal devices. The first base station determines whether the first cell has a first area whose load needs to be offloaded, based on the first spatial distribution. When determining that the first cell has the first area, the first base station sends, to one or more neighboring base stations, an offload request comprising part of the first spatial distribution corresponding to the first area.

6 Claims, 18 Drawing Sheets

(51) Int. Cl.

| | |
|---|---|
| *H04L 45/12* | (2022.01) |
| *H04W 16/04* | (2009.01) |
| *H04W 40/12* | (2009.01) |

(52) U.S. Cl.

CPC .......... *H04L 45/124* (2013.01); *H04W 16/04* (2013.01); *H04W 40/12* (2013.01)

(56) References Cited

U.S. PATENT DOCUMENTS

| | | | |
|---|---|---|---|
| 10,098,125 B2 | 10/2018 | Yuan et al. | |
| 2018/0323842 A1 | 11/2018 | Majmundar et al. | |
| 2019/0132778 A1 | 5/2019 | Park et al. | |
| 2020/0008245 A1* | 1/2020 | Yan ................... | H04W 36/0072 |

FOREIGN PATENT DOCUMENTS

| | | | |
|---|---|---|---|
| CN | 109152083 A | 1/2019 |
| EP | 2770773 A1 | 8/2014 |
| WO | 2015117640 A1 | 8/2015 |
| WO | 2017148535 A1 | 9/2017 |

OTHER PUBLICATIONS

3GPP, "3rd Generation Partnership Project; Technical Specification Group Radio Access Network; NR; Physical channels and modulation (Release 15)", 3GPP TS 38.211 V15.1.0, Mar. 2018, 1-90.

3GPP, "3rd Generation Partnership Project; Technical Specification Group Radio Access Network; NR; Physical layer procedures for data (Release 15)", 3GPP TS 38.214 V15.1.0, Mar. 2018, 1-77.

3GPP, "3rd Generation Partnership Project; Technical Specification Group Radio Access Network; NR; User Equipment (UE) radio transmission and reception; Part 2: Range 2 Standalone (Release 15)", 3GPP TS 38.101-2 V15.4.0, Dec. 2018, 1-131.

Ericsson, "Enhancements to load sharing and load balance", 3GPP TSG-RAN WG3 #103, R3-190825, Athens, Greece, Feb. 25-Mar. 1, 2019, 1-5.

Malmström, Magnus, "5G Positioning using Machine Learning", Master of Science Thesis in Applied Mathematics Department of Electrical Engineering, Linköping University, 2018, 1-71.

* cited by examiner

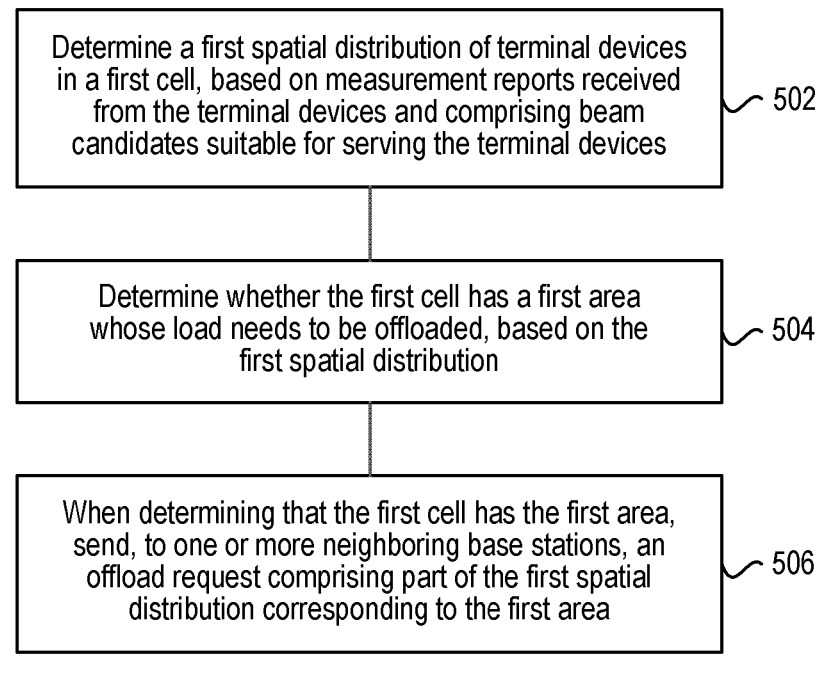

Determine a first spatial distribution of terminal devices in a first cell, based on measurement reports received from the terminal devices and comprising beam candidates suitable for serving the terminal devices ⟋ 502

Determine whether the first cell has a first area whose load needs to be offloaded, based on the first spatial distribution ⟋ 504

When determining that the first cell has the first area, send, to one or more neighboring base stations, an offload request comprising part of the first spatial distribution corresponding to the first area ⟋ 506

FIG. 5

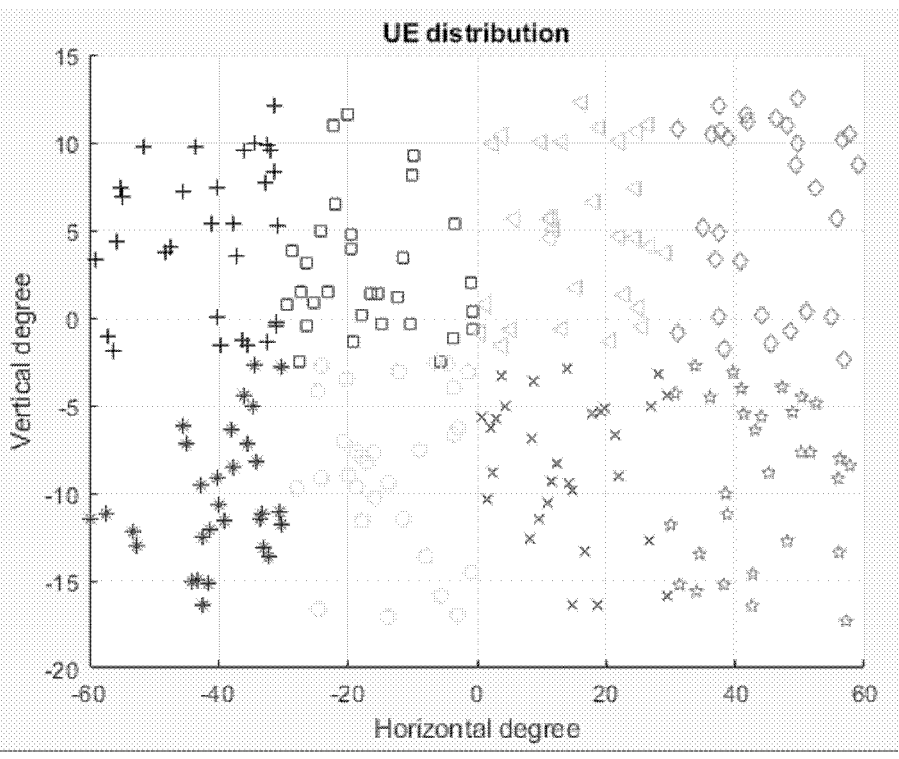

FIG. 6

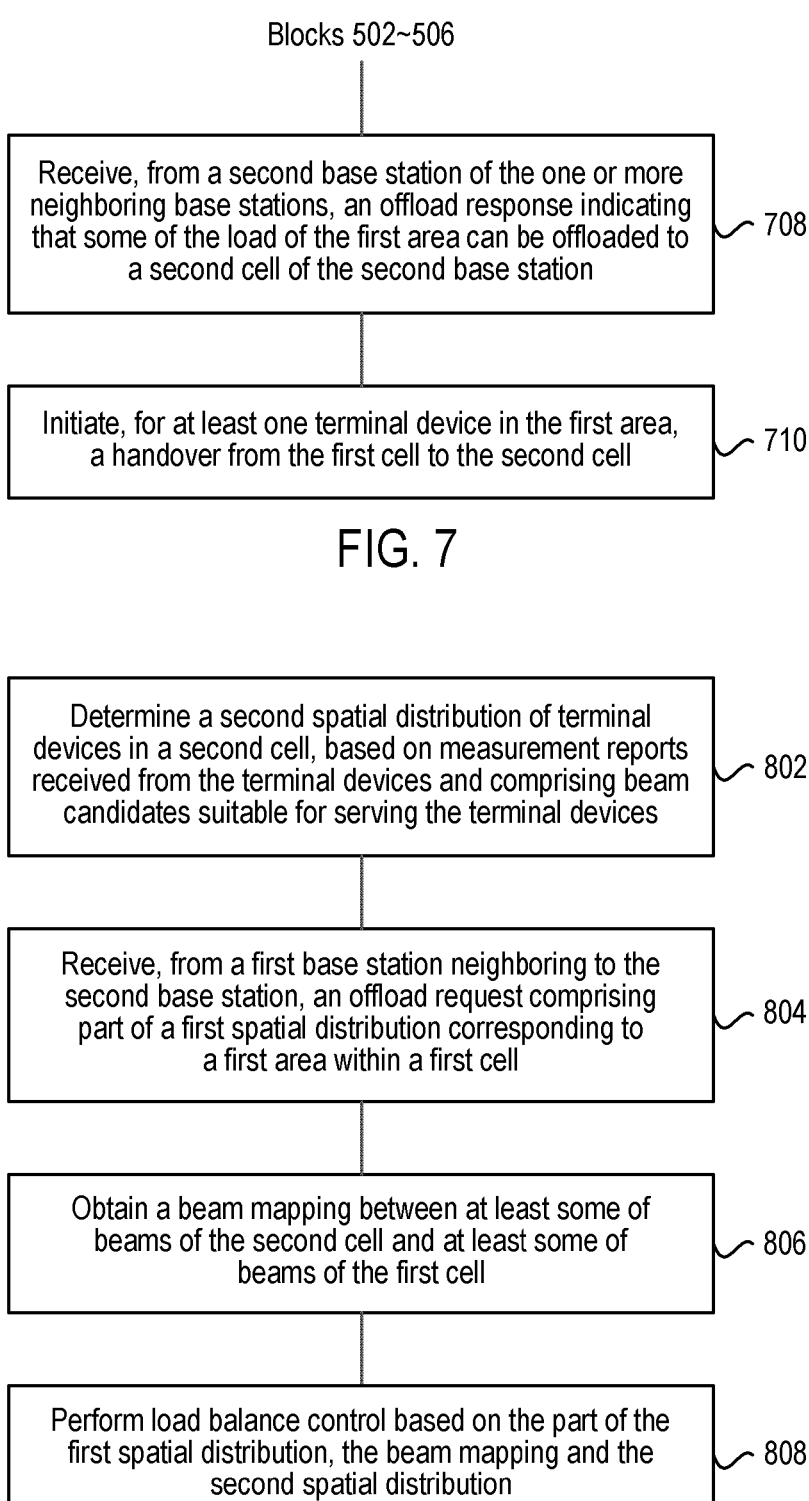

Blocks 502~506

Receive, from a second base station of the one or more neighboring base stations, an offload response indicating that some of the load of the first area can be offloaded to a second cell of the second base station ⟋ 708

Initiate, for at least one terminal device in the first area, a handover from the first cell to the second cell ⟋ 710

FIG. 7

Determine a second spatial distribution of terminal devices in a second cell, based on measurement reports received from the terminal devices and comprising beam candidates suitable for serving the terminal devices ⟋ 802

Receive, from a first base station neighboring to the second base station, an offload request comprising part of a first spatial distribution corresponding to a first area within a first cell ⟋ 804

Obtain a beam mapping between at least some of beams of the second cell and at least some of beams of the first cell ⟋ 806

Perform load balance control based on the part of the first spatial distribution, the beam mapping and the second spatial distribution ⟋ 808

FIG. 8

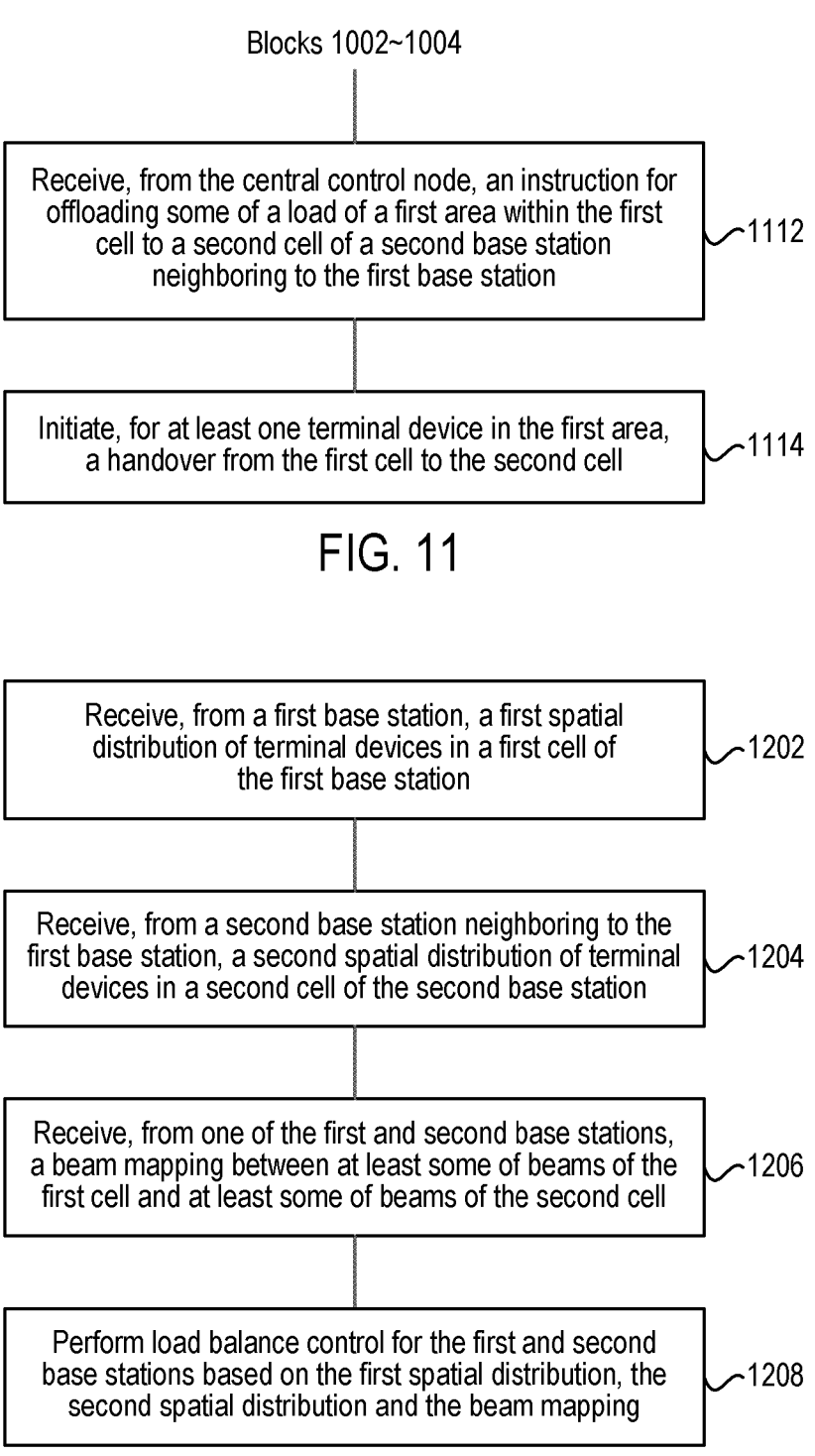

Blocks 1002~1004

Receive, from the central control node, an instruction for offloading some of a load of a first area within the first cell to a second cell of a second base station neighboring to the first base station ⟋1112

Initiate, for at least one terminal device in the first area, a handover from the first cell to the second cell ⟋1114

FIG. 11

Receive, from a first base station, a first spatial distribution of terminal devices in a first cell of the first base station ⟋1202

Receive, from a second base station neighboring to the first base station, a second spatial distribution of terminal devices in a second cell of the second base station ⟋1204

Receive, from one of the first and second base stations, a beam mapping between at least some of beams of the first cell and at least some of beams of the second cell ⟋1206

Perform load balance control for the first and second base stations based on the first spatial distribution, the second spatial distribution and the beam mapping ⟋1208

FIG. 12

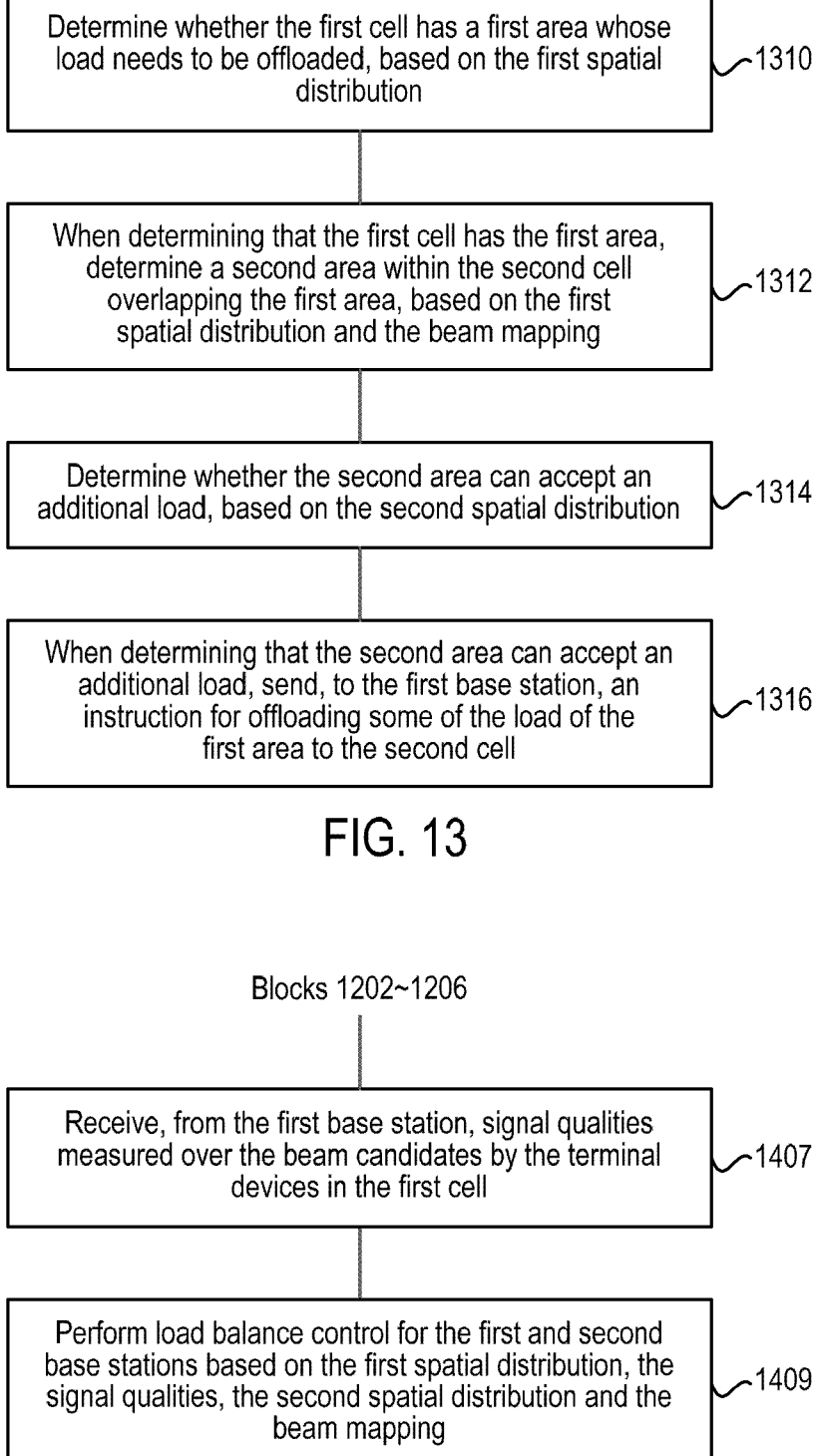

Determine whether the first cell has a first area whose load needs to be offloaded, based on the first spatial distribution ⟋1310

When determining that the first cell has the first area, determine a second area within the second cell overlapping the first area, based on the first spatial distribution and the beam mapping ⟋1312

Determine whether the second area can accept an additional load, based on the second spatial distribution ⟋1314

When determining that the second area can accept an additional load, send, to the first base station, an instruction for offloading some of the load of the first area to the second cell ⟋1316

FIG. 13

Blocks 1202~1206

Receive, from the first base station, signal qualities measured over the beam candidates by the terminal devices in the first cell ⟋1407

Perform load balance control for the first and second base stations based on the first spatial distribution, the signal qualities, the second spatial distribution and the beam mapping ⟋1409

FIG. 14

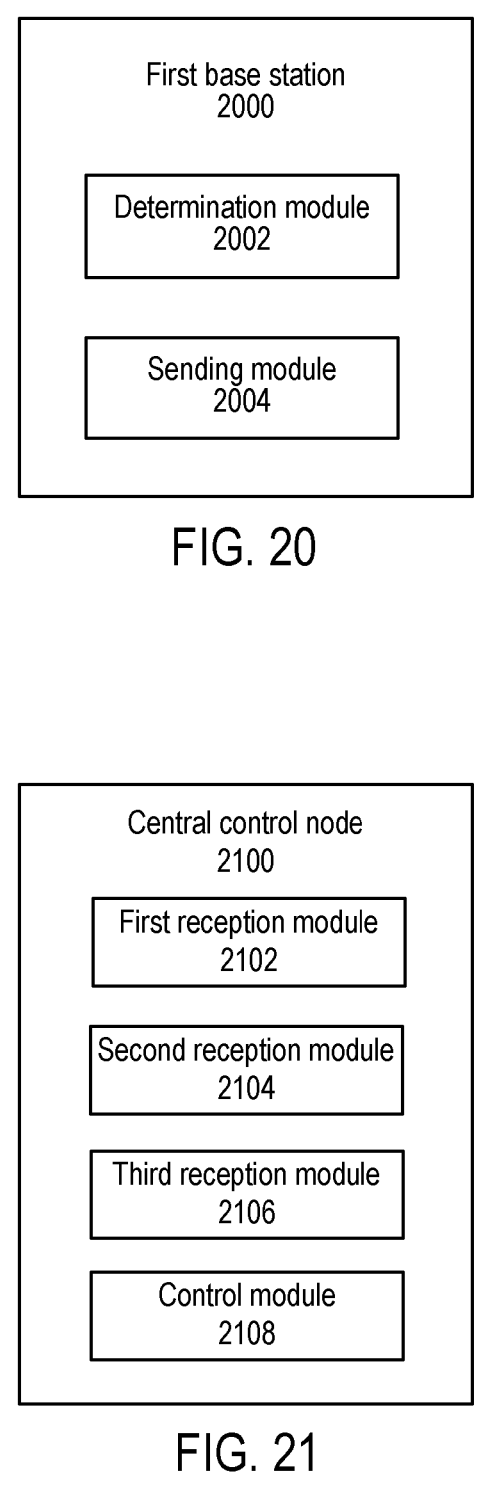

First base station
2000

Determination module
2002

Sending module
2004

FIG. 20

Central control node
2100

First reception module
2102

Second reception module
2104

Third reception module
2106

Control module
2108

FIG. 21

METHODS AND APPARATUSES FOR LOAD BALANCE

TECHNICAL FIELD

Embodiments of the disclosure generally relate to communication, and, more particularly, to methods and apparatuses for load balance.

BACKGROUND

This section introduces aspects that may facilitate better understanding of the present disclosure. Accordingly, the statements of this section are to be read in this light and are not to be understood as admissions about what is in the prior art or what is not in the prior art.

The 5th generation wireless systems, abbreviated as 5G, are improved by wireless network technologies deploying in near future. The primary technologies include: millimeter wave bands (26, 28, 38, and 60 GHz) which offer performance as high as 20 gigabits per second; massive multiple input multiple output (MIMO) which uses about 64-256 antennas and offers performance up to ten times the current fourth generation (4G) networks; "Low-band 5G" and "Mid-band 5G" which use frequencies from 600 MHz to 6 GHz. It is being designed to significantly improve the performance, flexibility, scalability and efficiency of the current mobile networks, and to get the most out of the available spectrum that can be licensed, shared or unlicensed, across a wide variety of spectrum bands.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

One of the objects of the disclosure is to provide an improved solution for load balance.

According to a first aspect of the disclosure, there is provided a method in a first base station. The method comprises determining a first spatial distribution of terminal devices in a first cell of the first base station, based on measurement reports which are received from the terminal devices and comprise beam candidates suitable for serving the terminal devices. The method further comprises determining whether the first cell has a first area whose load needs to be offloaded, based on the first spatial distribution. The method further comprises, when determining that the first cell has the first area, sending, to one or more neighboring base stations, an offload request comprising part of the first spatial distribution corresponding to the first area.

In this way, the spatial distribution of terminal devices can be considered into load balance.

In an embodiment of the disclosure, the method further comprises receiving, from a second base station of the one or more neighboring base stations, an offload response indicating that some of the load of the first area can be offloaded to a second cell of the second base station. The method further comprises initiating, for at least one terminal device in the first area, a handover from the first cell to the second cell.

In an embodiment of the disclosure, the determining the first spatial distribution comprises dividing the beam candidates into multiple groups based on directions of the beam candidates. The multiple groups act as the first spatial distribution.

In an embodiment of the disclosure, the first cell is determined to have the first area when a distribution density in the first area is above a first predetermined threshold.

In an embodiment of the disclosure, the measurement reports further comprise signal qualities over the beam candidates. Whether the first cell has the first area is determined based further on the signal qualities.

In an embodiment of the disclosure, the first cell is determined to have the first area when a distribution density in the first area is above a first predetermined threshold and a statistical value of the signal qualities in the first area is above a second predetermined threshold.

According to a second aspect of the disclosure, there is provided a method in a second base station. The method comprises determining a second spatial distribution of terminal devices in a second cell of the second base station, based on measurement reports which are received from the terminal devices and comprise beam candidates suitable for serving the terminal devices. The method further comprises receiving, from a first base station neighboring to the second base station, an offload request comprising part of a first spatial distribution corresponding to a first area within a first cell of the first base station. The first spatial distribution is a spatial distribution of terminal devices in the first cell. The method further comprises obtaining a beam mapping between at least some of beams of the second cell and at least some of beams of the first cell. The method further comprises performing load balance control based on the part of the first spatial distribution, the beam mapping and the second spatial distribution.

In this way, the spatial distribution of terminal devices can be considered into load balance.

In an embodiment of the disclosure, the performing the load balance control comprises determining a second area within the second cell overlapping the first area based on the part of the first spatial distribution and the beam mapping. The performing the load balance control further comprises determining whether the second area can accept an additional load, based on the second spatial distribution. The performing the load balance control further comprises, when determining that the second area can accept an additional load, sending, to the first base station, an offload response indicating that some of a load of the first area can be offloaded to the second cell.

In an embodiment of the disclosure, the determining the second spatial distribution comprises dividing the beam candidates into multiple groups based on directions of the beam candidates. The multiple groups act as the second spatial distribution.

In an embodiment of the disclosure, the second base station determines that the second area can accept an additional load, when a distribution density in the second area is smaller than a predetermined threshold.

According to a third aspect of the disclosure, there is provided a method in a first base station. The method comprises determining a first spatial distribution of terminal devices in a first cell of the first base station, based on measurement reports which are received from the terminal devices and comprise beam candidates suitable for serving the terminal devices. The method further comprises sending the first spatial distribution to a central control node.

In this way, the spatial distribution of terminal devices can be provided to a central control node for load balance.

In an embodiment of the disclosure, the method further comprises obtaining a beam mapping between at least some of beams of the first cell and at least some of beams of a second cell of a second base station neighboring to the first base station. The method further comprises sending the beam mapping to the central control node.

In an embodiment of the disclosure, the method further comprises receiving, from the central control node, an instruction for offloading some of a load of a first area within the first cell to a second cell of a second base station neighboring to the first base station. The method further comprises initiating, for at least one terminal device in the first area, a handover from the first cell to the second cell.

In an embodiment of the disclosure, the determining the first spatial distribution comprises dividing the beam candidates into multiple groups based on directions of the beam candidates. The multiple groups act as the first spatial distribution.

In an embodiment of the disclosure, the measurement reports further comprise signal qualities over the beam candidates. The method further comprises sending the signal qualities to the central control node.

According to a fourth aspect of the disclosure, there is provided a method in a central control node. The method comprises receiving, from a first base station, a first spatial distribution of terminal devices in a first cell of the first base station. The method further comprises receiving, from a second base station neighboring to the first base station, a second spatial distribution of terminal devices in a second cell of the second base station. The method further comprises receiving, from one of the first and second base stations, a beam mapping between at least some of beams of the first cell and at least some of beams of the second cell. The method further comprises performing load balance control for the first and second base stations based on the first spatial distribution, the second spatial distribution and the beam mapping.

In this way, the spatial distribution of terminal devices can be considered into load balance.

In an embodiment of the disclosure, the performing the load balance control comprises determining whether the first cell has a first area whose load needs to be offloaded, based on the first spatial distribution. The performing the load balance control further comprises, when determining that the first cell has the first area, determining a second area within the second cell overlapping the first area, based on the first spatial distribution and the beam mapping. The performing the load balance control further comprises determining whether the second area can accept an additional load, based on the second spatial distribution. The performing the load balance control further comprises, when determining that the second area can accept an additional load, sending, to the first base station, an instruction for offloading some of the load of the first area to the second cell.

In an embodiment of the disclosure, the first cell is determined to have the first area when a distribution density in the first area is above a first predetermined threshold.

In an embodiment of the disclosure, the method further comprises receiving, from the first base station, signal qualities measured over the beam candidates by the terminal devices in the first cell. Whether the first cell has the first area is determined based further on the signal qualities.

In an embodiment of the disclosure, the first cell is determined to have the first area when a distribution density in the first area is above a first predetermined threshold and a statistical value of the signal qualities in the first area is above a second predetermined threshold.

In an embodiment of the disclosure, the central control node determines that the second area can accept an additional load, when a distribution density in the second area is smaller than a third predetermined threshold.

According to a fifth aspect of the disclosure, there is provided a first base station. The first base station comprises at least one processor and at least one memory. The at least one memory contains instructions executable by the at least one processor, whereby the first base station is operative to determine a first spatial distribution of terminal devices in a first cell of the first base station, based on measurement reports which are received from the terminal devices and comprise beam candidates suitable for serving the terminal devices. The first base station is further operative to determine whether the first cell has a first area whose load needs to be offloaded, based on the first spatial distribution. The first base station is further operative to, when determining that the first cell has the first area, send, to one or more neighboring base stations, an offload request comprising part of the first spatial distribution corresponding to the first area.

In an embodiment of the disclosure, the first base station is operative to perform the method according to the above first aspect.

According to a sixth aspect of the disclosure, there is provided a second base station. The second base station comprises at least one processor and at least one memory. The at least one memory contains instructions executable by the at least one processor, whereby the second base station is operative to determine a second spatial distribution of terminal devices in a second cell of the second base station, based on measurement reports which are received from the terminal devices and comprise beam candidates suitable for serving the terminal devices. The second base station is further operative to receive, from a first base station neighboring to the second base station, an offload request comprising part of a first spatial distribution corresponding to a first area within a first cell of the first base station. The first spatial distribution is a spatial distribution of terminal devices in the first cell. The second base station is further operative to obtain a beam mapping between at least some of beams of the second cell and at least some of beams of the first cell. The second base station is further operative to perform load balance control based on the part of the first spatial distribution, the beam mapping and the second spatial distribution.

In an embodiment of the disclosure, the second base station is operative to perform the method according to the above second aspect.

According to a seventh aspect of the disclosure, there is provided a first base station. The first base station comprises at least one processor and at least one memory. The at least one memory contains instructions executable by the at least one processor, whereby the first base station is operative to determine a first spatial distribution of terminal devices in a first cell of the first base station, based on measurement reports which are received from the terminal devices and comprise beam candidates suitable for serving the terminal devices. The first base station is further operative to send the first spatial distribution to a central control node.

In an embodiment of the disclosure, the first base station is operative to perform the method according to the above third aspect.

According to an eighth aspect of the disclosure, there is provided a central control node. The central control node comprises at least one processor and at least one memory. The at least one memory contains instructions executable by the at least one processor, whereby the central control node is operative to receive, from a first base station, a first spatial distribution of terminal devices in a first cell of the first base station. The central control node is further operative to receive, from a second base station neighboring to the first base station, a second spatial distribution of terminal devices in a second cell of the second base station. The central control node is further operative to receive, from one of the first and second base stations, a beam mapping between at least some of beams of the first cell and at least some of beams of the second cell. The central control node is further operative to perform load balance control for the first and second base stations based on the first spatial distribution, the second spatial distribution and the beam mapping.

In an embodiment of the disclosure, the central control node is operative to perform the method according to the above fourth aspect.

According to a ninth aspect of the disclosure, there is provided a computer program product. The computer program product comprises instructions which when executed by at least one processor, cause the at least one processor to perform the method according to any of the above first to fourth aspects.

According to a tenth aspect of the disclosure, there is provided a computer readable storage medium. The computer readable storage medium comprises instructions which when executed by at least one processor, cause the at least one processor to perform the method according to any of the above first to fourth aspects.

According to an eleventh aspect of the disclosure, there is provided a first base station. The first base station comprises a first determination module for determining a first spatial distribution of terminal devices in a first cell of the first base station, based on measurement reports which are received from the terminal devices and comprise beam candidates suitable for serving the terminal devices. The first base station further comprises a second determination module for determining whether the first cell has a first area whose load needs to be offloaded, based on the first spatial distribution. The first base station further comprises a sending module for, when determining that the first cell has the first area, sending, to one or more neighboring base stations, an offload request comprising part of the first spatial distribution corresponding to the first area.

According to a twelfth aspect of the disclosure, there is provided a second base station. The second base station comprises a determination module for determining a second spatial distribution of terminal devices in a second cell of the second base station, based on measurement reports which are received from the terminal devices and comprise beam candidates suitable for serving the terminal devices. The second base station further comprises a reception module for receiving, from a first base station neighboring to the second base station, an offload request comprising part of a first spatial distribution corresponding to a first area within a first cell of the first base station. The first spatial distribution is a spatial distribution of terminal devices in the first cell. The second base station further comprises an obtaining module for obtaining a beam mapping between at least some of beams of the second cell and at least some of beams of the first cell. The second base station further comprises a control module for performing load balance control based on the part of the first spatial distribution, the beam mapping and the second spatial distribution.

According to a thirteenth aspect of the disclosure, there is provided a first base station. The first base station comprises a determination module for determining a first spatial distribution of terminal devices in a first cell of the first base station, based on measurement reports which are received from the terminal devices and comprise beam candidates suitable for serving the terminal devices. The first base station further comprises a sending module for sending the first spatial distribution to a central control node.

According to a fourteenth aspect of the disclosure, there is provided a central control node. The central control node comprises a first reception module for receiving, from a first base station, a first spatial distribution of terminal devices in a first cell of the first base station. The central control node further comprises a second reception module for receiving, from a second base station neighboring to the first base station, a second spatial distribution of terminal devices in a second cell of the second base station. The central control node further comprises a third reception module for receiving, from one of the first and second base stations, a beam mapping between at least some of beams of the first cell and at least some of beams of the second cell. The central control node further comprises a control module for performing load balance control for the first and second base stations based on the first spatial distribution, the second spatial distribution and the beam mapping.

BRIEF DESCRIPTION OF THE DRAWINGS

These and other objects, features and advantages of the disclosure will become apparent from the following detailed description of illustrative embodiments thereof, which are to be read in connection with the accompanying drawings.

FIG. 5 is a flowchart illustrating a method implemented at a first base station according to an embodiment of the disclosure;

FIG. 6 is a diagram illustrating an exemplary spatial distribution of UEs;

FIG. 7 is a flowchart illustrating a method implemented at a first base station according to an embodiment of the disclosure;

FIG. 8 is a flowchart illustrating a method implemented at a second base station according to an embodiment of the disclosure;

FIG. 11 is a flowchart illustrating a method implemented at a first base station according to an embodiment of the disclosure;

FIG. 12 is a flowchart illustrating a method implemented at a central control node according to an embodiment of the disclosure;

FIG. 13 is a flowchart for explaining the method of FIG. 12;

FIG. 14 is a flowchart illustrating a method implemented at a central control node according to an embodiment of the disclosure;

FIG. 20 is a block diagram showing a first base device according to an embodiment of the disclosure;

FIG. 21 is a block diagram showing a central control node according to an embodiment of the disclosure;

DETAILED DESCRIPTION

For the purpose of explanation, details are set forth in the following description in order to provide a thorough understanding of the embodiments disclosed. It is apparent, however, to those skilled in the art that the embodiments may be implemented without these specific details or with an equivalent arrangement.

Next-generation cellular networks must provide a set of mechanisms by which user equipments (UEs) and next generation node base (gNB) stations establish highly directional transmission links, typically using high-dimensional phased arrays, to benefit from the resulting beamforming gain and sustain an acceptable communication quality. Directional links, however, require fine alignment of the transmitter and receiver beams, achieved through a set of operations known as beam management. They are fundamental to perform a variety of control tasks including initial access idle users, which allows a mobile UE to establish a physical link connection with a gNB, and beam tracking, for connected users, which enable beam adaptation schemes, or handover, path selection and radio link failure recovery procedures.

Figure 1:
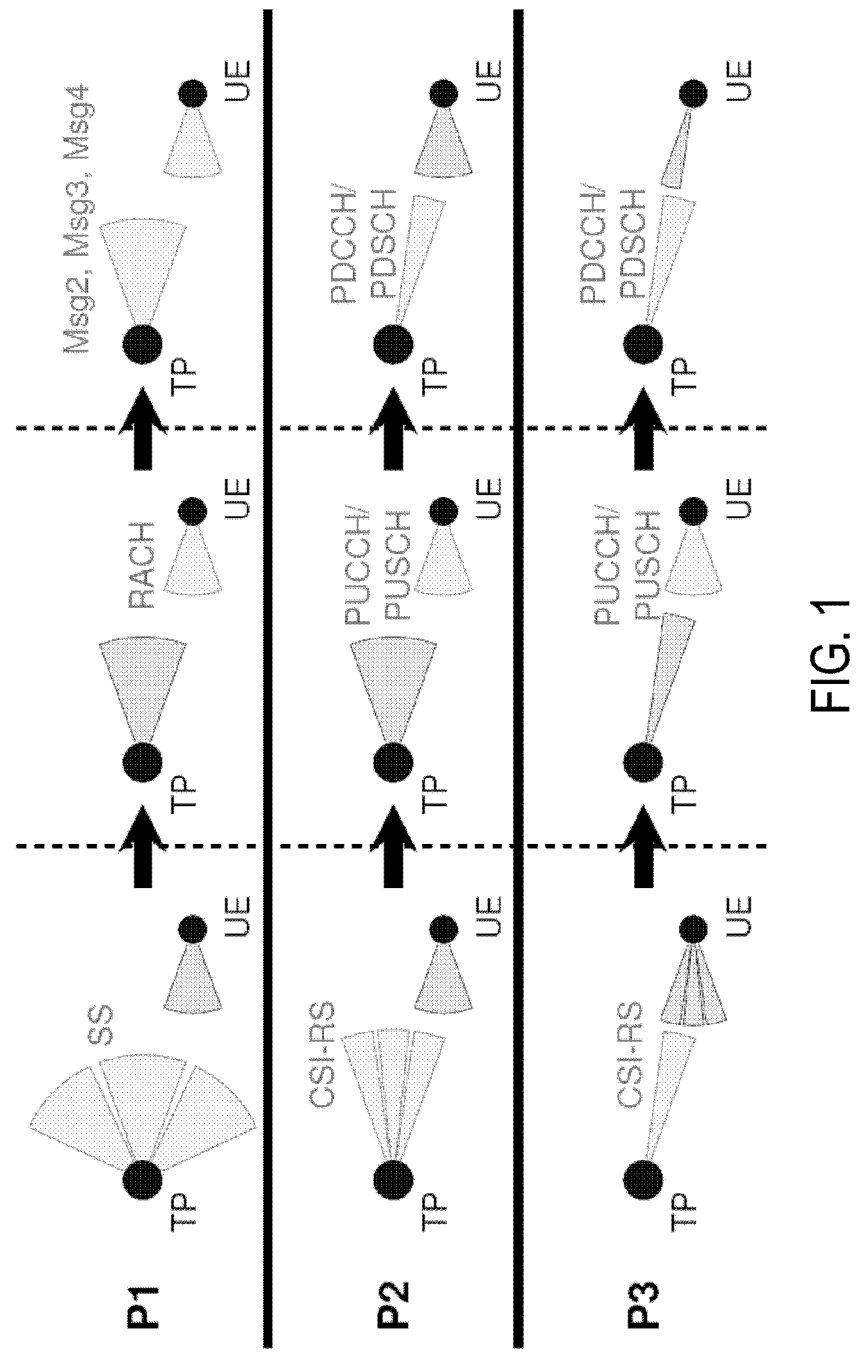
FIG. 1 is a diagram illustrating beam management procedures.

FIG. 1 is a diagram illustrating beam management procedures. As shown, the beam management procedures in 5G may comprise the following phases. At the first phase (P1), initial beam selection is performed, where a wide transmission reception point (TRP) transmission (Tx) beam is initially selected. At the second phase (P2), TRP Tx beam refinement is performed, where the gNB determines its Tx beam according to the UE's report. At the third phase (P3), UE reception (Rx) beam refinement is performed, where the UE Rx beam is determined when the TRP Tx beam is selected. In the above beam management procedures, the gNB must configure channel state information reference signal (CSI-RS) for the UE to measure available beams. The UE shall then report a list of beam candidates and their corresponding quality values, e.g. reference signal receiving powers (RSRPs). On reception of this report, the gNB selects one as the downlink (DL) Tx beam for this UE. Afterwards, the UE Rx beam is selected towards the DL Tx beam selected. More details can be available in 3rd generation partnership project (3GPP) technical specification (TS) 38.214 V15.1.0.

According to TS 38.214 V15.1.0, base stations shall configure DL reference signals. A UE shall then monitor those signals to evaluate the beam qualities and shall report to base stations. From UE perspective, in beam reporting, the most favorable beams are reported by the UE to greedily increase possible UE data rates. From gNB perspective, it is much more interested in increasing system throughput by selecting proper beams from the reported ones in consideration of mobile user (MU) grouping.

Figure 2:
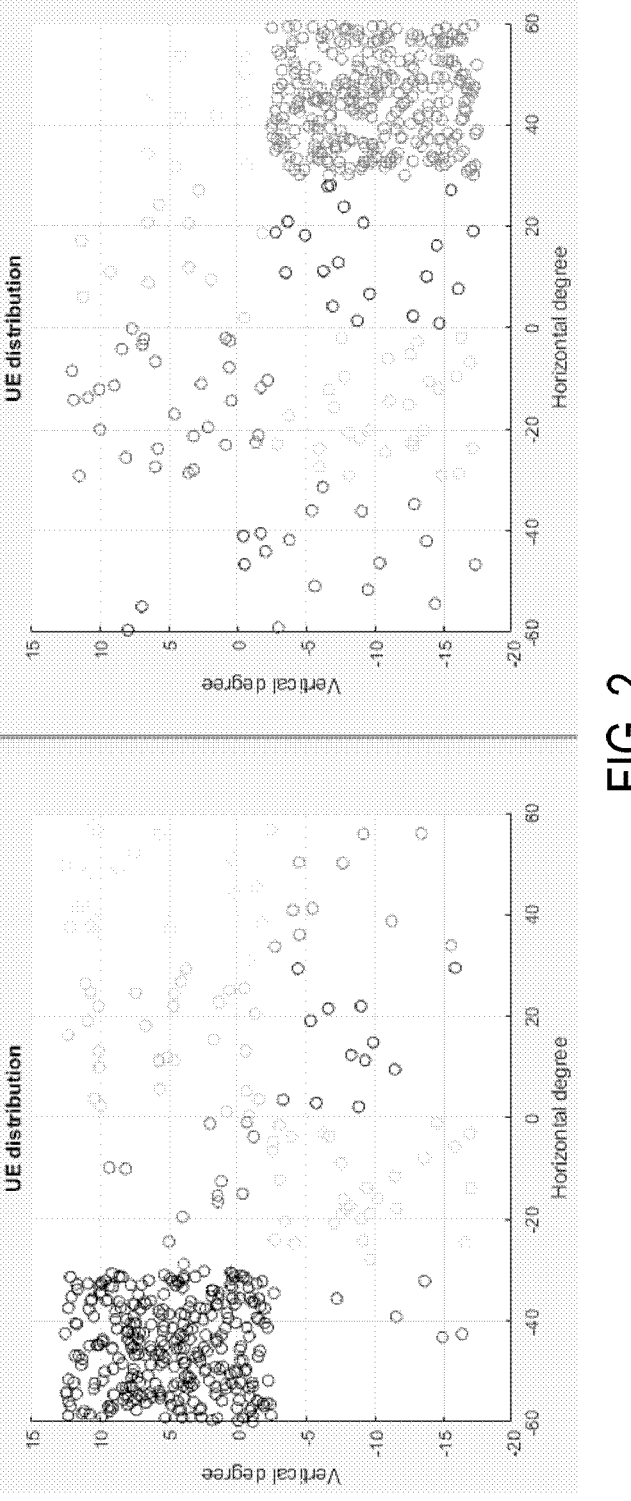
FIG. 2 is a diagram illustrating issues on system throughput degradation.

In the following scenarios, there may be issues on system throughput degradation. As shown in the left part of FIG. 2, there are a lot of UEs at the left-up corner at one cell. Meanwhile, as shown in the right part of FIG. 2, there are a lot of UEs at the right-down corner at the other cell. From the statistical perspective, in the left cell, if not all UEs are frequently served by big packages or then most of UEs are served by small or medium packages from time to time, it may occur that there are always some UEs at the left-up corner having traffic demand, while UEs on the other areas do not need to be scheduled at most of time. Since UEs are asymmetrically distributed over the cell coverage, the UEs scheduled at one transmission opportunity are close to each other. This implies the average number of MU layers is small.

In at least one aspect, the present disclosure proposes a load balancing solution to resolve the asymmetric distribution. Hereinafter, the solution will be described in detail with reference to the figures.

Figure 3:
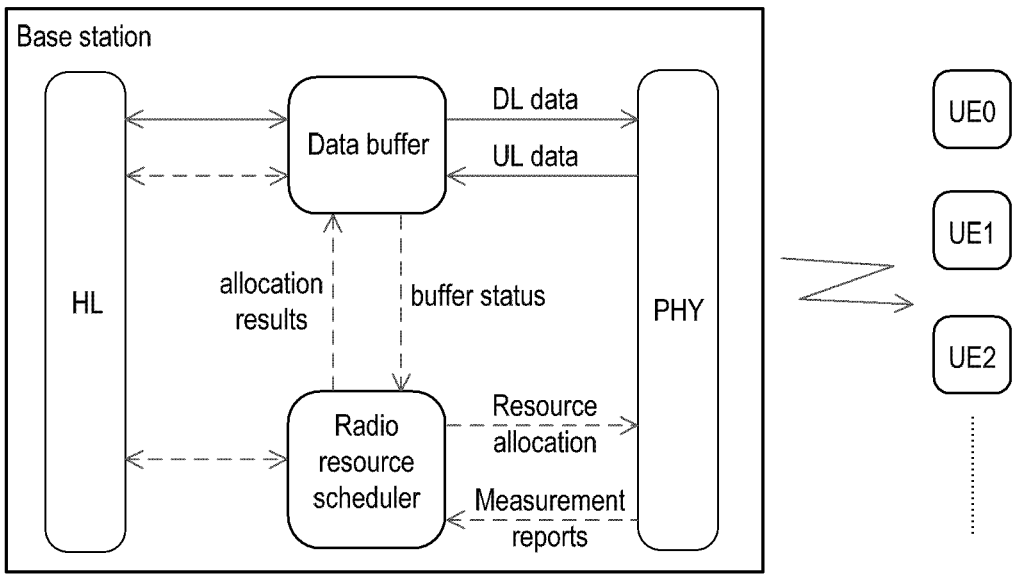
FIG. 3 is a diagram illustrating an exemplary communication system into which an embodiment of the disclosure is applicable.

FIG. 3 is a diagram illustrating an exemplary communication system into which an embodiment of the disclosure is applicable. The communication system may be a time division duplexing (TDD) and/or frequency division duplexing (FDD) system in long term evolution (LTE) 4G or NR 5G. As shown, the communication system comprises a base station and a plurality of user equipments (UEs). Although only one base station is shown in FIG. 3, the number of base stations may be more than one. For example, multiple base stations may be connected via a core network such that information can be shared between them. In the base station, the high layer (HL) conveys data and signaling with the physical layer (PHY). The HL refers to open system interconnection (OSI) layers above layer 2 and the PHY refers to OSI layer 1. The data buffer stores uplink (UL) and downlink (DL) data for UE. The radio resource scheduler assigns radio resource to UE. According to the allocation results, the data buffer prepares data for the PHY and the PHY transmits data to or receives data from UE. The PHY takes care of channel measurement and reports to the scheduler the measurement results which are input arguments to scheduling algorithms. UE shall follow the configuration and scheduling for radio resource from the base station.

The term UE may be used interchangeably with the term terminal device in this disclosure. The UE can communicate through a radio access communication link with the base station. The base station can provide radio access communication links to UEs that are within its communication service cell. Note that the communications may be performed between the UE and the base station according to any suitable communication standards and protocols. The UE may also be referred to as, for example, terminal device, access terminal, mobile station, mobile unit, subscriber station, or the like. It may refer to any end device that can access a wireless communication network and receive services therefrom. By way of example and not limitation, the UE may include a portable computer, an image capture terminal device such as a digital camera, a gaming terminal device, a music storage and playback appliance, a mobile phone, a cellular phone, a smart phone, a tablet, a wearable device, a personal digital assistant (PDA), or the like.

In an Internet of things (IoT) scenario, a UE may represent a machine or other device that performs monitoring and/or measurements, and transmits the results of such monitoring and/or measurements to another UE and/or a network equipment. In this case, the UE may be a machine-to-machine (M2M) device, which may, in a 3GPP context, be referred to as a machine-type communication (MTC) device. Particular examples of such machines or devices may include sensors, metering devices such as power meters, industrial machineries, bikes, vehicles, or home or personal appliances, e.g. refrigerators, televisions, personal wearables such as watches, and so on.

Figure 4:
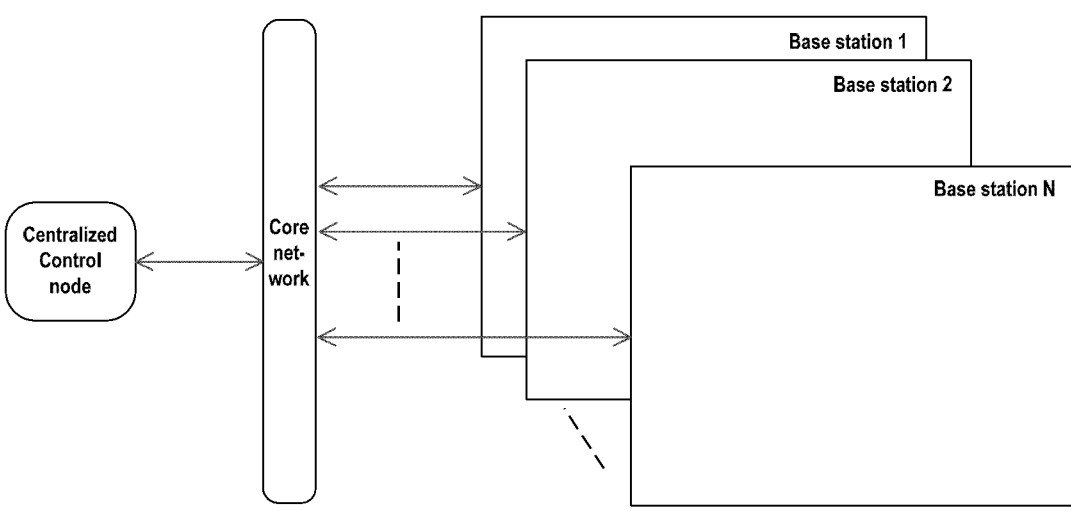
FIG. 4 is a diagram illustrating another exemplary communication system into which an embodiment of the disclosure is applicable.

FIG. 4 is a diagram illustrating another exemplary communication system into which an embodiment of the disclosure is applicable. As shown, a plurality of base stations may be connected to a central control node (or centralized decision maker) via a core network. For example, the central control node may be a centralized unit (CU) as defined in cloud radio access network (C-RAN) architecture. As detailed later, the base stations can send related information to the central control node. The central control node can jointly consider information shared by different base stations and run decision making methods for spatial load balance. Thus, the input arguments and output results can be communicated via the core network(s).

FIG. 5 is a flowchart illustrating a method implemented at a first base station according to an embodiment of the disclosure. At block 502, the first base station determines a first spatial distribution of terminal devices in a first cell of the first base station, based on measurement reports which are received from the terminal devices and comprise beam candidates suitable for serving the terminal devices. As an example, for a terminal device, beam candidate(s) suitable for serving the terminal device may be one or more beam candidates favorite for the terminal device. As another example, beam candidate(s) suitable for serving the terminal device may be one or more beam candidates which are actually used by the first base station for serving the terminal device after beam management.

In the present disclosure, the spatial distribution of terminal devices can be embodied as a spatial distribution of corresponding beam candidates. Thus, when the spatial distribution of terminal devices is processed, the processed objects are beam candidates but not terminal devices. For example, the first spatial distribution may be determined by dividing the beam candidates into multiple groups based on directions of the beam candidates. In this case, the multiple groups can act as the first spatial distribution. Terminal devices in different groups can be assigned with the same time and frequency resource without significant interference. Optionally, the beam candidates may be divided within a certain sliding time window. After one sliding time window has elapsed, beam candidates reported by terminal devices in the first cell may be reevaluated within the next sliding time window.

For ease of understanding, FIG. 6 illustrates an exemplary spatial distribution of UEs. Since the beam width of a beam depends on the carrier frequency and radio antennas, even the same beam is preferred by two UEs, they may be at different locations within this beam. In this figure, a random model was employed to scatter the UEs which preferred the same beam. The scattered area is limited to the beam width. The following assumptions are employed: 1) the radio covers [−60, 60] degree over horizontal and [−15, 15] degree over vertical; 2) the center of the planar facing towards the radio antenna is at (0, 0); 3) each point refers to the UE direction randomly scattered by $\phi(i)$, where this UE prefers beam index i. Then, according to the beam index i, all the samples were divided into 8 groups, denoted by different shapes of symbols.

However, the present disclosure is not limited to the above example. Optionally, in addition to the beam candidates, other merits (e.g. signal qualities over the beam candidates) may be additionally used to locate the terminal devices. Various existing or future developed techniques may be used for this purpose. The signal qualities may be represented by any suitable merit, such as RSRP, signal to interference plus noise ratio (SINR), etc. Although the distance (in the case of line-of-sight propagation) or the route (in the case of non-line-of-sight propagation) between UEs and the base station is not considered in FIG. 6, it may be additionally considered in another example. In yet another example, it is also possible to do a three-dimensional UE classification (or grouping).

At block 504, the first base station determines whether the first cell has a first area whose load needs to be offloaded, based on the first spatial distribution. For example, the first area may be one of the multiple groups described above or a portion thereof. The first cell may be determined to have the first area when a distribution density (of beam candidates) in the first area is above a first predetermined threshold. Optionally, the measurement reports may further comprise signal qualities over the beam candidates and whether the first cell has the first area may be determined based further on the signal qualities. For example, the first cell may be determined to have the first area when a distribution density in the first area is above the first predetermined threshold and a statistical value (e.g. an average value) of the signal qualities in the first area is above a second predetermined threshold. Optionally, traffic demands from terminal devices may also be considered. For example, if the distribution density in one group of beam candidates is above the first predetermined threshold and the traffic demands on the beam candidates during a certain time period are above a first traffic threshold, the first base station may determine that the load of this one group needs to be offloaded.

When determining that the first cell has the first area, the first base station sends, at block 506, to one or more neighboring base stations, an offload request comprising part of the first spatial distribution corresponding to the first area. For example, in the example of FIG. 6, if only one group is heavily loaded, the information about this one group may be contained in the offload request. With the method of FIG. 5, the spatial distribution of terminal devices can be considered into load balance.

FIG. 7 is a flowchart illustrating a method implemented at a first base station according to an embodiment of the disclosure. As shown, the method comprises blocks 502-506, 708 and 710. At block 708, the first base station receives, from a second base station of the one or more neighboring base stations, an offload response indicating that some of the load of the first area can be offloaded to a second cell of the second base station. For example, the offload response may indicate an upper bound (or upper limit) of the load that can be offloaded and information about the second cell. As an example, the upper bound may be expressed as a traffic amount (e.g. in the unit of megabits per second), or the number of beam candidates with a certain (e.g. low, medium or high) traffic demand, or the number of terminal devices with a certain (e.g. low, medium or high) traffic demand, or any other suitable metrics.

The information about the second cell may indicate a second area of the second cell overlapping the first area. The determination of the second area will be described later. As a first option, the second area may be indicated as beam indexes of beam candidates contained in the second area. As a second option, the beam indexes of beam candidates contained in the second area may be converted to corresponding beam indexes of beam candidates contained in the first area, according to a beam mapping. As described later, the beam mapping is between at least some of beams of the second cell and at least some of beams of the first cell and may be maintained by the second base station. Thus, in the first option, the first base station needs to obtain the beam mapping by either determining it by itself or receiving it from the second base station. Based on the obtained beam mapping, the first base station can determine the corresponding beam indexes of beam candidates contained in the first area. In contrast, in the second option, the first base station has no need to perform the obtaining and determining operations.

At block 710, the first base station initiates, for at least one terminal device in the first area, a handover from the first cell to the second cell. As described above, in either of the first and second options, the first base station can know the corresponding beam indexes of beam candidates contained in the first area. From these beam indexes, the first base station can know which terminal devices are served by the beams of these beam indexes. From these terminal devices, the at least one terminal device may be selected randomly or in a specific manner (e.g. by considering other factors such as signal qualities and/or traffic demands) based on the upper bound of the load that can be offloaded. With the method of FIG. 7, the spatial distribution of terminal devices can be averaged between the two cells. As a result, the average number of MU layers can be increased. Then, the cell throughput can be enhanced and the frequency efficiency can be improved.

FIG. 8 is a flowchart illustrating a method implemented at a second base station according to an embodiment of the disclosure. At block 802, the second base station determines a second spatial distribution of terminal devices in a second cell of the second base station, based on measurement reports which are received from the terminal devices and comprise beam candidates suitable for serving the terminal devices. The determination of the second spatial distribution may be performed in a way similar to that of the first spatial distribution. At block 804, the second base station receives, from a first base station neighboring to the second base station, an offload request comprising part of a first spatial distribution corresponding to a first area within a first cell of the first base station. The first spatial distribution is a spatial distribution of terminal devices in the first cell.

At block 806, the second base station obtains a beam mapping between at least some of beams of the second cell and at least some of beams of the first cell. If the two cells share the same radio and their operating frequency bands are close to each other, the beam mapping can be straightforwardly derived. For other configurations, various existing or future developed methods for out-of-band beam alignment may be used for obtaining the beam mapping. As an exemplary example, the method disclosed in U.S. Pat. No. 10,098, 125 B2 may be used for this purpose. Note that block 806 may not be necessarily performed in response to an offload request. At block 808, the second base station performs load balance control based on the part of the first spatial distribution, the beam mapping and the second spatial distribution.

Figures 9, 10:
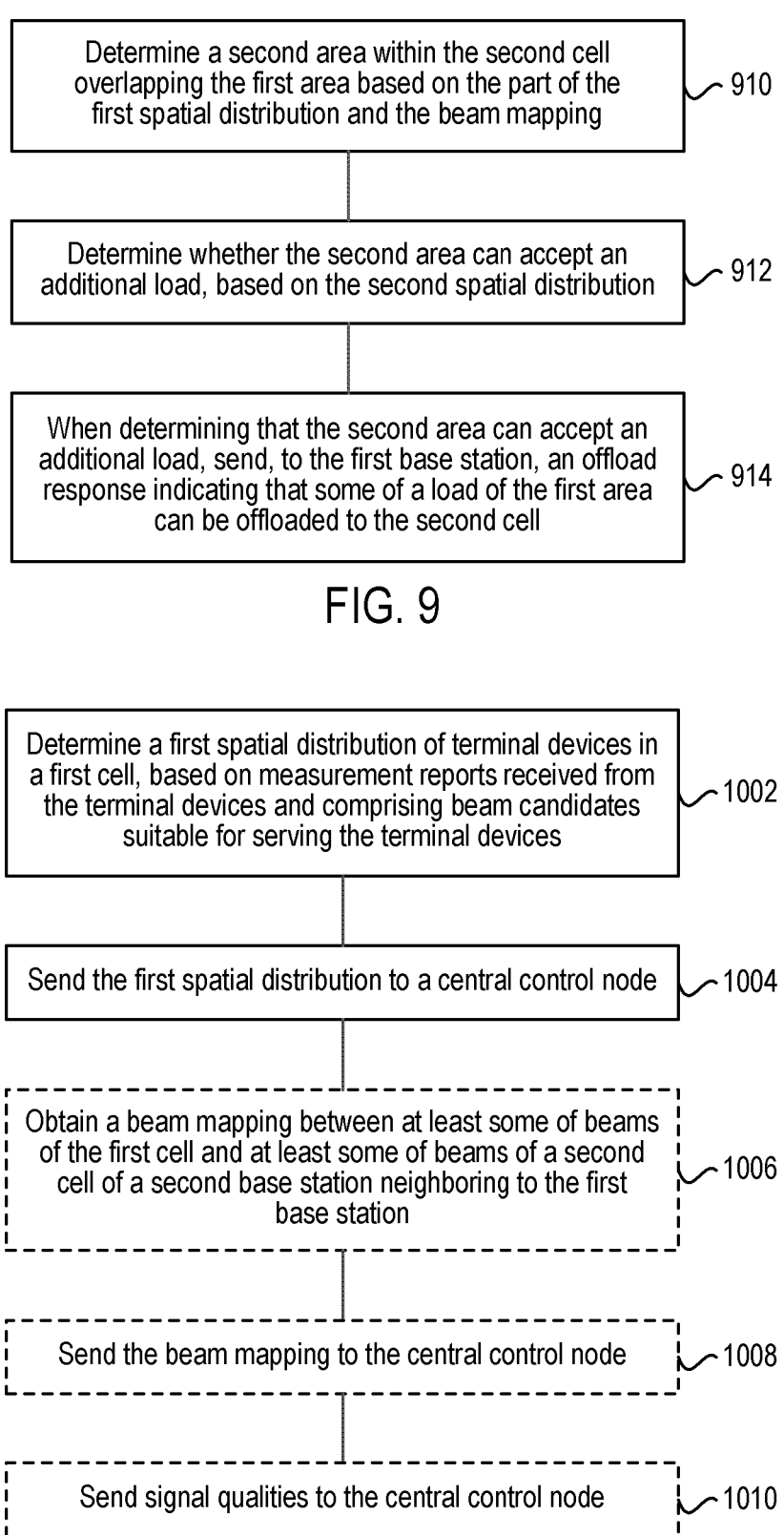
FIG. 9 is a flowchart for explaining the method of FIG. 8.
FIG. 10 is a flowchart illustrating a method implemented at a first base station according to an embodiment of the disclosure.

For example, block 808 may be implemented as blocks 910-914 of FIG. 9. At block 910, the second base station determines a second area within the second cell overlapping the first area based on the part of the first spatial distribution and the beam mapping. For example, beam indexes of the beam candidates contained in the part of the first spatial distribution may be mapped to corresponding beam indexes of beam candidates according to the beam mapping. The area of the second cell in which the corresponding beam indexes are located may be determined as the second area. At block 912, the second base station determines whether the second area can accept an additional load, based on the second spatial distribution. For example, if a distribution density (of beam candidates) in the second area is smaller than a predetermined threshold, the second base station may determine that the second area can accept an additional load. Optionally, traffic demands from terminal devices may also be considered. For example, if the distribution density of beam candidates in the second area is smaller than the predetermined threshold and the traffic demands on the beam candidates during a certain time period are smaller than a second traffic threshold, the second base station may determine that the second area can accept an additional load.

In response to determining that the second area can accept an additional load, the second base station sends, at block 914, to the first base station, an offload response indicating that some of a load of the first area can be offloaded to the second cell. Details about the offload response have been described above and thus are omitted here.

As an exemplary example, assume the first cell and the second cell share the same radio, while they are operated over different and close frequency bands. Thus, the beam mapping between them can be naturally obtained. With the method shown in FIG. 9, when detecting the scenario shown in FIG. 2, the left cell can offload some UE(s) in the up-left corner to the right cell, while the right cell can offload some UE(s) in the bottom-right corner to the left cell. Then, the UE distributions in the both cells can be averaged. As a result, the UEs have more opportunity to use the same time and frequency radio resource with spatially multiplexing and the average MU layers can be increased.

FIG. 10 is a flowchart illustrating a method implemented at a first base station according to an embodiment of the disclosure. Unlike the distributed solutions shown in FIGS. 5, 7, 8 and 9, FIGS. 10-14 show centralized solutions. At block 1002, the first base station determines a first spatial distribution of terminal devices in a first cell of the first base station, based on measurement reports which are received from the terminal devices and comprise beam candidates suitable for serving the terminal devices. Block 1002 is the same as block 502 and its details are omitted here. At block 1004, the first base station sends the first spatial distribution to a central control node. In this way, the spatial distribution of terminal devices can be provided to the central control node for load balance.

Since the beam mapping mentioned above is the same for a given pair of base stations, one of these base stations may be preconfigured to send the beam mapping to the central control node, while the other of these base stations has no need to send the beam mapping. Thus, blocks 1006 and 1008 may be optionally performed. At block 1006, the first base station may obtain a beam mapping between at least some of beams of the first cell and at least some of beams of a second cell of a second base station neighboring to the first base station. At block 1008, the first base station may send the beam mapping to the central control node. Optionally, the measurement reports may further comprise signal qualities over the beam candidates. Thus, at block 1010, the first base station may optionally send the signal qualities to the central control node. Optionally, information about traffic demands from the terminal devices in the first cell may also be sent to the central control node for load balance.

FIG. 11 is a flowchart illustrating a method implemented at a first base station according to an embodiment of the disclosure. As shown, the method comprises blocks 1002-1004, 1112 and 1114. Blocks 1006, 1008 and 1010 in FIG. 10 are optional in the method of FIG. 11. At block 1112, the first base station receives, from the central control node, an instruction for offloading some of a load of a first area within the first cell to a second cell of a second base station neighboring to the first base station. For example, the instruction may indicate the upper bound of the load that can be offloaded and information about the second cell. As described above, the upper bound may be expressed as a traffic amount (e.g. in the unit of megabits per second), or the number of beam candidates with a certain (e.g. low, medium or high) traffic demand, or the number of terminal devices with a certain (e.g. low, medium or high) traffic demand, or any other suitable metrics.

Also as described above, the information about the second cell may indicate a second area of the second cell overlapping the first area. As a first option, the second area may be indicated as beam indexes of beam candidates contained in the second area. As a second option, the beam indexes of beam candidates contained in the second area may be converted to corresponding beam indexes of beam candidates contained in the first area, according to a beam mapping maintained by the central control node. Thus, in the first option, the first base station needs to obtain the beam mapping. Based on the obtained beam mapping, the first base station can determine the corresponding beam indexes of beam candidates contained in the first area. In contrast, in the second option, the first base station has no need to perform the obtaining and determining operations.

At block 1114, the first base station initiates, for at least one terminal device in the first area, a handover from the first cell to the second cell. As described above, in either of the first and second options, the first base station can know the corresponding beam indexes of beam candidates contained in the first area. From these beam indexes, the first base station can know which terminal devices are served by the beams of these beam indexes. From these terminal devices, the at least one terminal device may be selected randomly or in a specific manner (e.g. by considering other factors such as signal qualities and/or traffic demands) based on the upper bound of the load that can be offloaded.

FIG. 12 is a flowchart illustrating a method implemented at a central control node according to an embodiment of the disclosure. At block 1202, the central control node receives, from a first base station, a first spatial distribution of terminal devices in a first cell of the first base station. At block 1204, the central control node receives, from a second base station neighboring to the first base station, a second spatial distribution of terminal devices in a second cell of the second base station. At block 1206, the central control node receives, from one of the first and second base stations, a beam mapping between at least some of beams of the first cell and at least some of beams of the second cell. At block 1208, the central control node performs load balance control for the first and second base stations based on the first spatial distribution, the second spatial distribution and the beam mapping.

For example, block 1208 may be implemented as blocks 1310-1316 of FIG. 13. At block 1310, the central control node determines whether the first cell has a first area whose load needs to be offloaded, based on the first spatial distribution. This determination may be performed in a way similar to block 504. In response to determining that the first cell has the first area, the central control node determines, at block 1312, a second area within the second cell overlapping the first area, based on the first spatial distribution and the beam mapping. This determination may be performed in a way similar to block 910. At block 1314, the central control node determines whether the second area can accept an additional load, based on the second spatial distribution. For example, if a distribution density (of beam candidates) in the second area is smaller than a third predetermined threshold, the central control node may determine that the second area can accept an additional load. Optionally, traffic demands from terminal devices may also be considered. For example, if the distribution density of beam candidates in the second area is smaller than the predetermined threshold and the traffic demands on the beam candidates during a certain time period are smaller than a second traffic threshold, the second base station may determine that the second area can accept an additional load. In response to determining that the second area can accept an additional load, the central control node sends, at block 1316, to the first base station, an instruction for offloading some of the load of the first area to the second cell. Details about the offload response have been described above and thus are omitted here.

FIG. 14 is a flowchart illustrating a method implemented at a central control node according to an embodiment of the disclosure. As shown, the method comprises blocks 1202-1206, 1407 and 1409. At block 1407, the central control node receives, from the first base station, signal qualities measured over the beam candidates by the terminal devices in the first cell. The signal qualities may be received separately from or together with the first spatial distribution. At block 1409, the central control node performs load balance control for the first and second base stations based on the first spatial distribution, the signal qualities, the second spatial distribution and the beam mapping. Block 1409 may be performed in a way similar to block 1208 except that whether the first cell has the first area is determined based further on the signal qualities. For example, the first cell may be determined to have the first area when a distribution density in the first area is above a first predetermined threshold and a statistical value of the signal qualities in the first area is above a second predetermined threshold. Optionally, traffic demands from terminal devices may also be considered. For example, if the distribution density in one group of beam candidates is above the first predetermined threshold and the traffic demands on the beam candidates during a certain time period are above a traffic threshold, the central control node may determine that the load of this one group needs to be offloaded.

Figure 15:
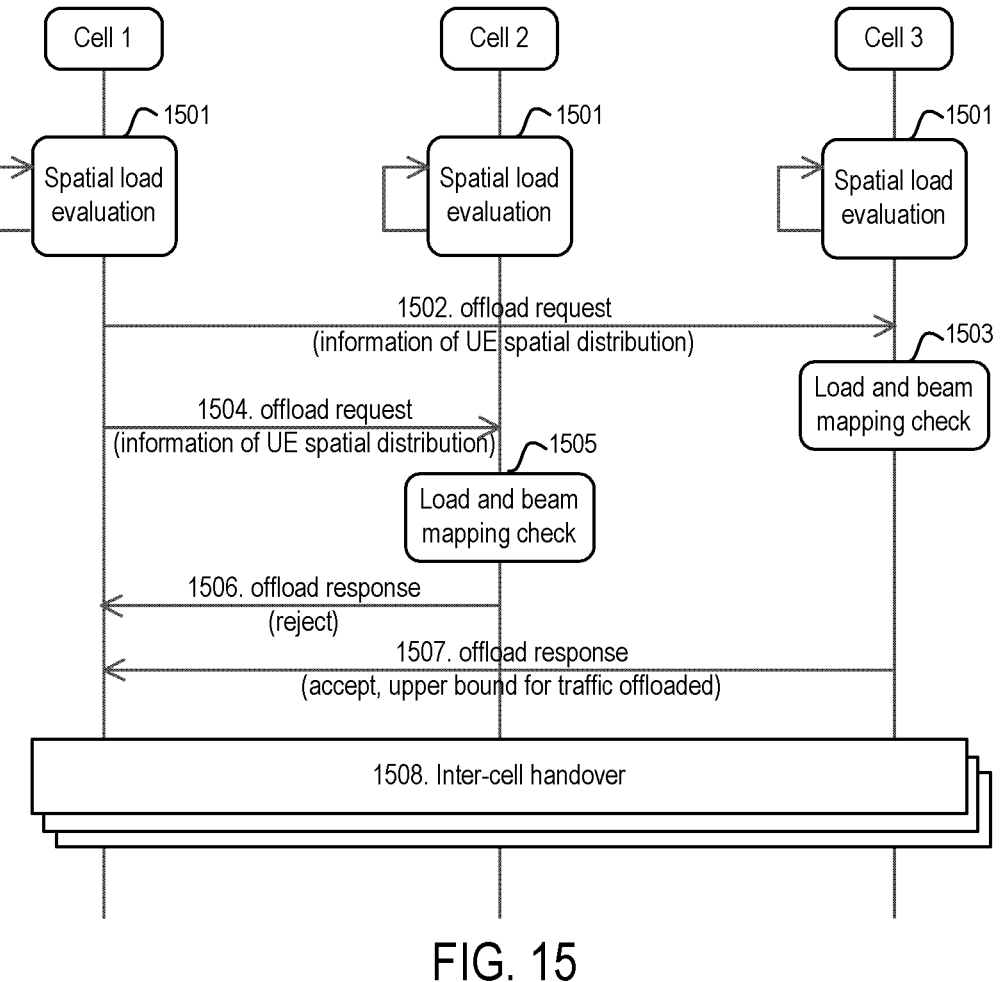
FIG. 15 is a flowchart illustrating an exemplary process according to an embodiment of the disclosure.
Figure 16:
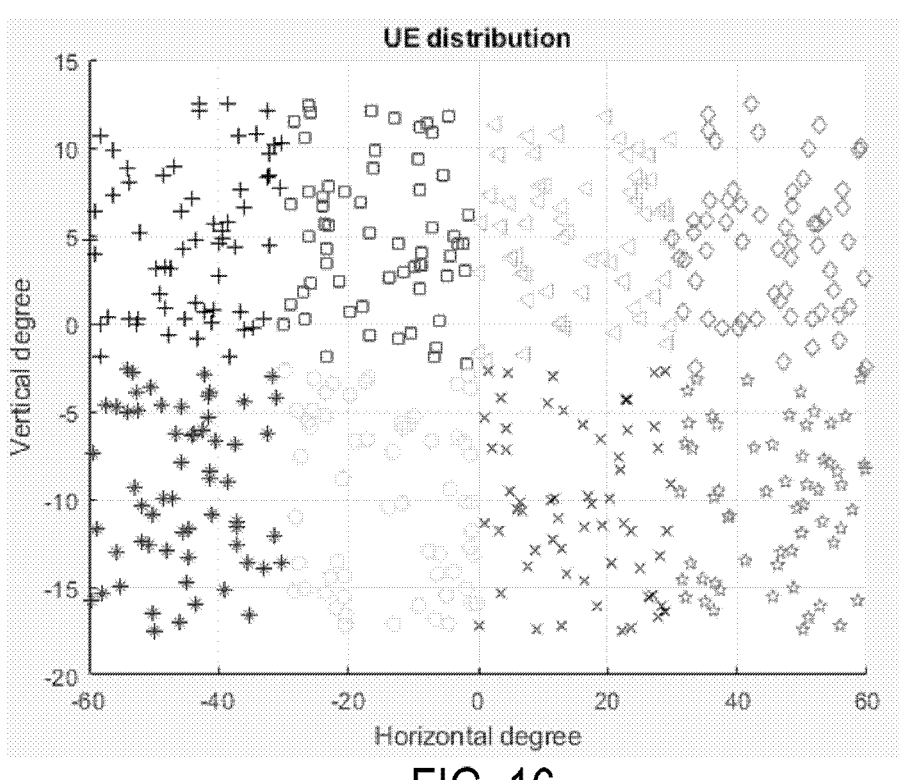
FIG. 16 is a diagram illustrating an exemplary symmetric spatial distribution of UEs.

FIG. 15 is a flowchart illustrating an exemplary process according to an embodiment of the disclosure. This exemplary process aims at symmetric UE distribution over directions within one cell coverage as shown in FIG. 16. At block 1501, the cells periodically evaluate their UE distribution over cell coverage based on measurement reporting, such as beam candidates and optionally RSRP, SINR and etc. Suppose Cell 1 identifies that an area thereof is heavily loaded. Then, Cell 1 broadcasts to its neighboring cells an offloading request which brings the spatial information about offloading UEs. Specifically, Cell 1 sends an offloading request to Cell 3 at block 1502 and sends an offloading request to Cell 2 at block 1504.

If one neighboring cell identifies that it can accept an additional load, it can response for the request, which brings the upper bound for traffic acceptance. Otherwise, it can reject the request. Specifically, Cell 3 performs load and beam mapping check at block 1503 and Cell 2 performs load and beam mapping check at block 1505. Suppose Cell 3 can accept an additional load, while Cell 2 cannot accept any additional load. Then, Cell 3 sends an offload response at block 1507 to accept the offload request. Cell 2 sends an offload response at block 1506 to reject the offload request. Upon reception of the response of acceptance, Cell 1 triggers inter-cell handover at block 1508. In this way, the probability of MU can be increased and then the average number of MU layers can be increased.

It should be noted that the application of the present disclosure can be extended to multiple cells belonging to the same radio access technology (RAT) (e.g. 2 NR cells or 2 LTE cells), or multiple bandwidth parts (BWPs) within one NR cell. In addition, the principle of the present disclosure can be applied not only to co-site cells/BWPs, but also cells having overlapped coverage area. Thus, the term cell in this disclosure can cover the meaning of BWP or the like. It should be also noted that two blocks shown in succession in the figures may, in fact, be executed substantially concurrently, or the blocks may sometimes be executed in the reverse order, depending upon the functionality involved.

Figure 17:
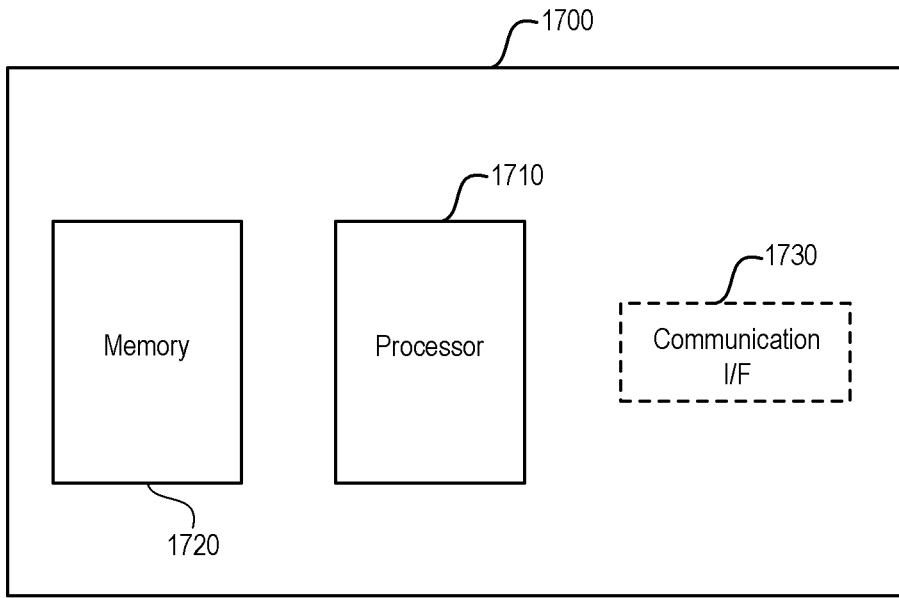
FIG. 17 is a block diagram showing an apparatus suitable for use in practicing some embodiments of the disclosure.

FIG. 17 is a block diagram showing an apparatus suitable for use in practicing some embodiments of the disclosure. For example, any one of the first base station, the second base station and the central control node described above may be implemented through the apparatus 1700. As shown, the apparatus 1700 may include a processor 1710, a memory 1720 that stores a program, and optionally a communication interface 1730 for communicating data with other external devices through wired and/or wireless communication.

The program includes program instructions that, when executed by the processor 1710, enable the apparatus 1700 to operate in accordance with the embodiments of the present disclosure, as discussed above. That is, the embodiments of the present disclosure may be implemented at least in part by computer software executable by the processor 1710, or by hardware, or by a combination of software and hardware.

The memory 1720 may be of any type suitable to the local technical environment and may be implemented using any suitable data storage technology, such as semiconductor based memory devices, flash memories, magnetic memory devices and systems, optical memory devices and systems, fixed memories and removable memories. The processor 1710 may be of any type suitable to the local technical environment, and may include one or more of general purpose computers, special purpose computers, microprocessors, digital signal processors (DSPs) and processors based on multi-core processor architectures, as non-limiting examples.

Figure 18:
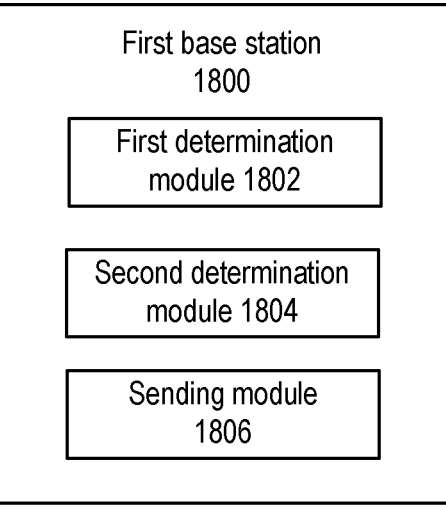
FIG. 18 is a block diagram showing a first base device according to an embodiment of the disclosure.

FIG. 18 is a block diagram showing a first base device according to an embodiment of the disclosure. As shown, the first base station 1800 comprises a first determination module 1802, a second determination module 1804 and a sending module 1806. The first determination module 1802 may be configured to determine a first spatial distribution of terminal devices in a first cell of the first base station, based on measurement reports which are received from the terminal devices and comprise beam candidates suitable for serving the terminal devices, as described above with respect to block 502. The second determination module 1804 may be configured to determine whether the first cell has a first area whose load needs to be offloaded, based on the first spatial distribution, as described above with respect to block 504. The sending module 1806 may be configured to, when determining that the first cell has the first area, send, to one or more neighboring base stations, an offload request comprising part of the first spatial distribution corresponding to the first area, as described above with respect to block 506.

Figure 19:
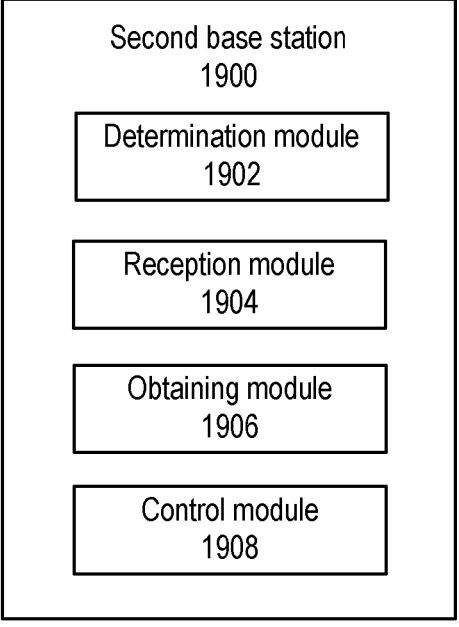
FIG. 19 is a block diagram showing a second base station according to an embodiment of the disclosure.

FIG. 19 is a block diagram showing a second base station according to an embodiment of the disclosure. As shown, the second base station 1900 comprises a determination module 1902, a reception module 1904, an obtaining module 1906 and a control module 1908. The determination module 1902 may be configured to determine a second spatial distribution of terminal devices in a second cell of the second base station, based on measurement reports which are received from the terminal devices and comprise beam candidates suitable for serving the terminal devices, as described above with respect to block 802. The reception module 1904 may be configured to receive, from a first base station neighboring to the second base station, an offload request comprising part of a first spatial distribution corresponding to a first area within a first cell of the first base station, as described above with respect to block 804. The first spatial distribution is a spatial distribution of terminal devices in the first cell. The obtaining module 1906 may be configured to obtain a beam mapping between at least some of beams of the second cell and at least some of beams of the first cell, as described above with respect to block 806. The control module 1908 may be configured to perform load balance control based on the part of the first spatial distribution, the beam mapping and the second spatial distribution, as described above with respect to block 808.

FIG. 20 is a block diagram showing a first base device according to an embodiment of the disclosure. As shown, the first base station 2000 comprises a determination module 2002 and a sending module 2004. The determination module 2002 may be configured to determine a first spatial distribution of terminal devices in a first cell of the first base station, based on measurement reports which are received from the terminal devices and comprise beam candidates suitable for serving the terminal devices, as described above with respect to block 1002. The sending module 2004 may be configured to send the first spatial distribution to a central control node, as described above with respect to block 1004.

FIG. 21 is a block diagram showing a central control node according to an embodiment of the disclosure. As shown, the central control node 2100 comprises a first reception module 2102, a second reception module 2104, a third reception module 2106 and a control module 2108. The first reception module 2102 may be configured receive, from a first base station, a first spatial distribution of terminal devices in a first cell of the first base station, as described above with respect to block 1202. The second reception module 2104 may be configured receive, from a second base station neighboring to the first base station, a second spatial distribution of terminal devices in a second cell of the second base station, as described above with respect to block 1204. The third reception module 2106 may be configured receive, from one of the first and second base stations, a beam mapping between at least some of beams of the first cell and at least some of beams of the second cell, as described above with respect to block 1206. The control module 2108 may be configured perform load balance control for the first and second base stations based on the first spatial distribution, the second spatial distribution and the beam mapping, as described above with respect to block 1208. The modules described above may be implemented by hardware, or software, or a combination of both.

Figure 22:
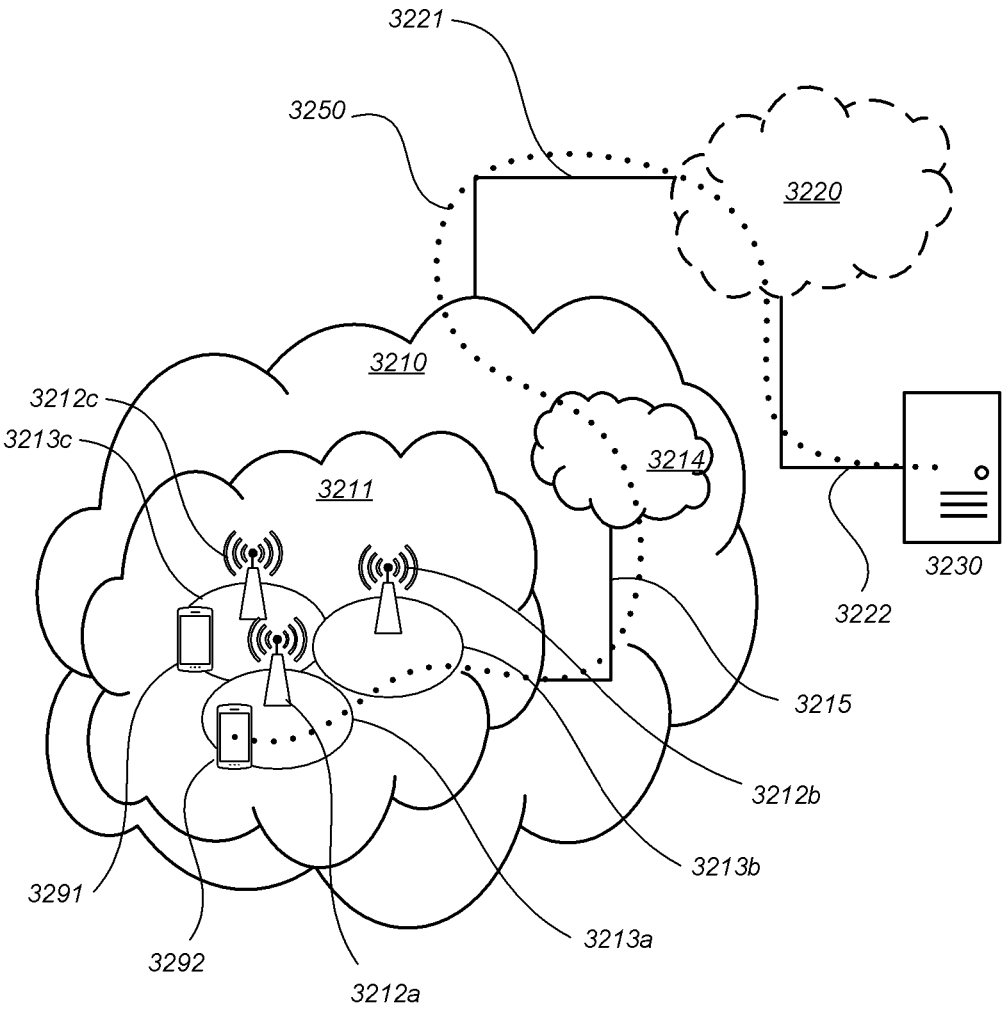
FIG. 22 is a diagram showing a telecommunication network connected via an intermediate network to a host computer in accordance with some embodiments.

With reference to FIG. 22, in accordance with an embodiment, a communication system includes telecommunication network 3210, such as a 3GPP-type cellular network, which comprises access network 3211, such as a radio access network, and core network 3214. Access network 3211 comprises a plurality of base stations 3212a, 3212b, 3212c, such as NBs, eNBs, gNBs or other types of wireless access points, each defining a corresponding coverage area 3213a, 3213b, 3213c. Each base station 3212a, 3212b, 3212c is connectable to core network 3214 over a wired or wireless connection 3215. A first UE 3291 located in coverage area 3213c is configured to wirelessly connect to, or be paged by, the corresponding base station 3212c. A second UE 3292 in coverage area 3213a is wirelessly connectable to the corresponding base station 3212a. While a plurality of UEs 3291, 3292 are illustrated in this example, the disclosed embodiments are equally applicable to a situation where a sole UE is in the coverage area or where a sole UE is connecting to the corresponding base station 3212.

Telecommunication network 3210 is itself connected to host computer 3230, which may be embodied in the hardware and/or software of a standalone server, a cloud-implemented server, a distributed server or as processing resources in a server farm. Host computer 3230 may be under the ownership or control of a service provider, or may be operated by the service provider or on behalf of the service provider. Connections 3221 and 3222 between telecommunication network 3210 and host computer 3230 may extend directly from core network 3214 to host computer 3230 or may go via an optional intermediate network 3220. Intermediate network 3220 may be one of, or a combination of more than one of, a public, private or hosted network; intermediate network 3220, if any, may be a backbone network or the Internet; in particular, intermediate network 3220 may comprise two or more sub-networks (not shown).

The communication system of FIG. 22 as a whole enables connectivity between the connected UEs 3291, 3292 and host computer 3230. The connectivity may be described as an over-the-top (OTT) connection 3250. Host computer 3230 and the connected UEs 3291, 3292 are configured to communicate data and/or signaling via OTT connection 3250, using access network 3211, core network 3214, any intermediate network 3220 and possible further infrastructure (not shown) as intermediaries. OTT connection 3250 may be transparent in the sense that the participating communication devices through which OTT connection 3250 passes are unaware of routing of uplink and downlink communications. For example, base station 3212 may not or need not be informed about the past routing of an incoming downlink communication with data originating from host computer 3230 to be forwarded (e.g., handed over) to a connected UE 3291. Similarly, base station 3212 need not be aware of the future routing of an outgoing uplink communication originating from the UE 3291 towards the host computer 3230.

Example implementations, in accordance with an embodiment, of the UE, base station and host computer discussed in the preceding paragraphs will now be described with reference to FIG. 23. In communication system 3300, host computer 3310 comprises hardware 3315 including communication interface 3316 configured to set up and maintain a wired or wireless connection with an interface of a different communication device of communication system 3300. Host computer 3310 further comprises processing circuitry 3318, which may have storage and/or processing capabilities. In particular, processing circuitry 3318 may comprise one or more programmable processors, application-specific integrated circuits, field programmable gate arrays or combinations of these (not shown) adapted to execute instructions. Host computer 3310 further comprises software 3311, which is stored in or accessible by host computer 3310 and executable by processing circuitry 3318. Software 3311 includes host application 3312. Host application 3312 may be operable to provide a service to a remote user, such as UE 3330 connecting via OTT connection 3350 terminating at UE 3330 and host computer 3310. In providing the service to the remote user, host application 3312 may provide user data which is transmitted using OTT connection 3350.

Communication system 3300 further includes base station 3320 provided in a telecommunication system and comprising hardware 3325 enabling it to communicate with host computer 3310 and with UE 3330. Hardware 3325 may include communication interface 3326 for setting up and maintaining a wired or wireless connection with an interface of a different communication device of communication system 3300, as well as radio interface 3327 for setting up and maintaining at least wireless connection 3370 with UE 3330 located in a coverage area (not shown in FIG. 23) served by base station 3320. Communication interface 3326 may be configured to facilitate connection 3360 to host computer 3310. Connection 3360 may be direct or it may pass through a core network (not shown in FIG. 23) of the telecommunication system and/or through one or more intermediate networks outside the telecommunication system. In the embodiment shown, hardware 3325 of base station 3320 further includes processing circuitry 3328, which may comprise one or more programmable processors, application-specific integrated circuits, field programmable gate arrays or combinations of these (not shown) adapted to execute instructions. Base station 3320 further has software 3321 stored internally or accessible via an external connection.

Communication system 3300 further includes UE 3330 already referred to. Its hardware 3335 may include radio interface 3337 configured to set up and maintain wireless connection 3370 with a base station serving a coverage area in which UE 3330 is currently located. Hardware 3335 of UE 3330 further includes processing circuitry 3338, which may comprise one or more programmable processors, application-specific integrated circuits, field programmable gate arrays or combinations of these (not shown) adapted to execute instructions. UE 3330 further comprises software 3331, which is stored in or accessible by UE 3330 and executable by processing circuitry 3338. Software 3331 includes client application 3332. Client application 3332 may be operable to provide a service to a human or non-human user via UE 3330, with the support of host computer 3310. In host computer 3310, an executing host application 3312 may communicate with the executing client application 3332 via OTT connection 3350 terminating at UE 3330 and host computer 3310. In providing the service to the user, client application 3332 may receive request data from host application 3312 and provide user data in response to the request data. OTT connection 3350 may transfer both the request data and the user data. Client application 3332 may interact with the user to generate the user data that it provides.

Figure 23:
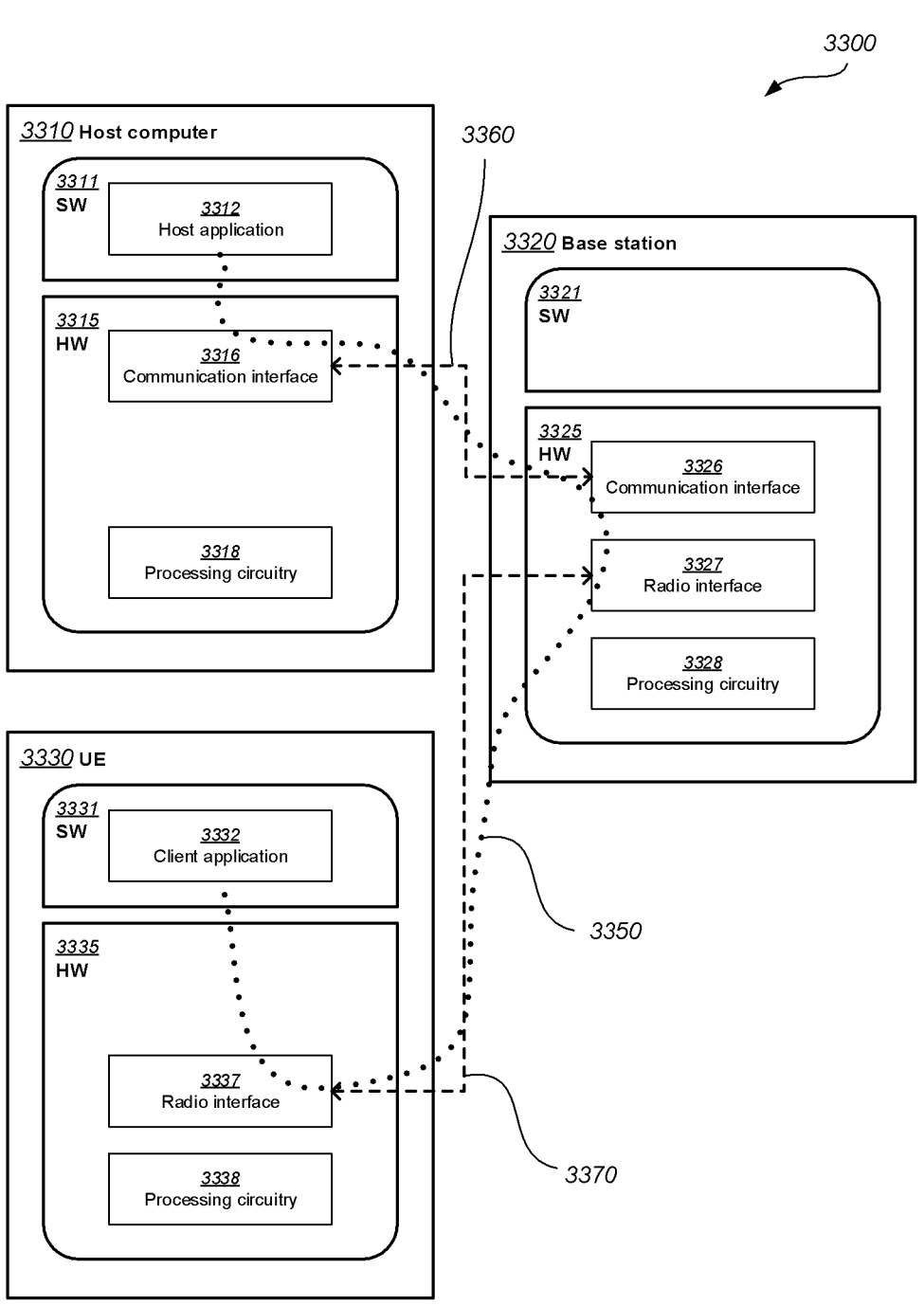
FIG. 23 is a diagram showing a host computer communicating via a base station with a user equipment in accordance with some embodiments.

It is noted that host computer 3310, base station 3320 and UE 3330 illustrated in FIG. 23 may be similar or identical to host computer 3230, one of base stations 3212*a*, 3212*b*, 3212*c* and one of UEs 3291, 3292 of FIG. 22, respectively. This is to say, the inner workings of these entities may be as shown in FIG. 23 and independently, the surrounding network topology may be that of FIG. 22.

In FIG. 23, OTT connection 3350 has been drawn abstractly to illustrate the communication between host computer 3310 and UE 3330 via base station 3320, without explicit reference to any intermediary devices and the precise routing of messages via these devices. Network infrastructure may determine the routing, which it may be configured to hide from UE 3330 or from the service provider operating host computer 3310, or both. While OTT connection 3350 is active, the network infrastructure may further take decisions by which it dynamically changes the routing (e.g., on the basis of load balancing consideration or reconfiguration of the network).

Wireless connection 3370 between UE 3330 and base station 3320 is in accordance with the teachings of the embodiments described throughout this disclosure. One or more of the various embodiments improve the performance of OTT services provided to UE 3330 using OTT connection 3350, in which wireless connection 3370 forms the last segment. More precisely, the teachings of these embodiments may improve the latency and thereby provide benefits such as reduced user waiting time.

A measurement procedure may be provided for the purpose of monitoring data rate, latency and other factors on which the one or more embodiments improve. There may further be an optional network functionality for reconfiguring OTT connection 3350 between host computer 3310 and UE 3330, in response to variations in the measurement results. The measurement procedure and/or the network functionality for reconfiguring OTT connection 3350 may be implemented in software 3311 and hardware 3315 of host computer 3310 or in software 3331 and hardware 3335 of UE 3330, or both. In embodiments, sensors (not shown) may be deployed in or in association with communication devices through which OTT connection 3350 passes; the sensors may participate in the measurement procedure by supplying values of the monitored quantities exemplified above, or supplying values of other physical quantities from which software 3311, 3331 may compute or estimate the monitored quantities. The reconfiguring of OTT connection 3350 may include message format, retransmission settings, preferred routing etc.; the reconfiguring need not affect base station 3320, and it may be unknown or imperceptible to base station 3320. Such procedures and functionalities may be known and practiced in the art. In certain embodiments, measurements may involve proprietary UE signaling facilitating host computer 3310's measurements of throughput, propagation times, latency and the like. The measurements may be implemented in that software 3311 and 3331 causes messages to be transmitted, in particular empty or 'dummy' messages, using OTT connection 3350 while it monitors propagation times, errors etc.

Figure 24:
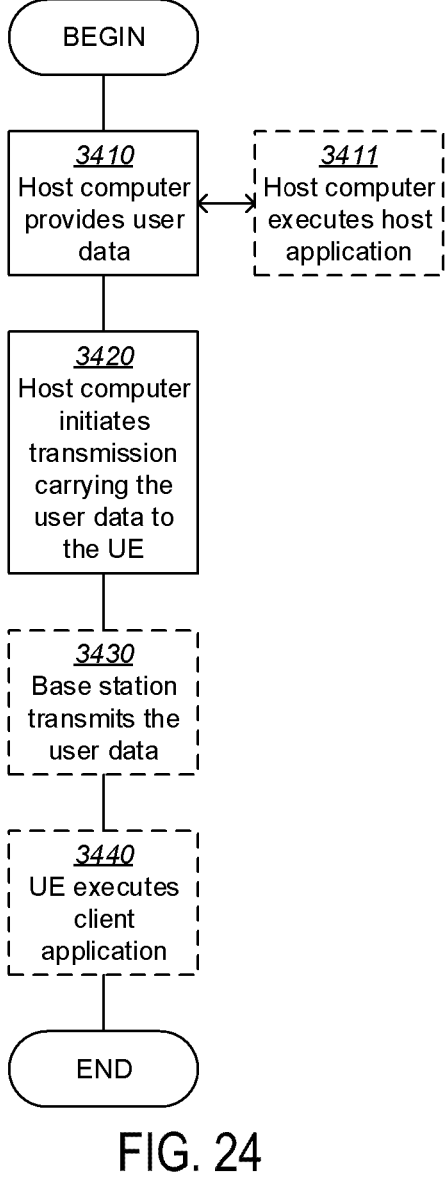
FIG. 24 is a flowchart illustrating a method implemented in a communication system in accordance with some embodiments.

FIG. 24 is a flowchart illustrating a method implemented in a communication system, in accordance with one embodiment. The communication system includes a host computer, a base station and a UE which may be those described with reference to FIGS. 22 and 23. For simplicity of the present disclosure, only drawing references to FIG. 24 will be included in this section. In step 3410, the host computer provides user data. In substep 3411 (which may be optional) of step 3410, the host computer provides the user data by executing a host application. In step 3420, the host computer initiates a transmission carrying the user data to the UE. In step 3430 (which may be optional), the base station transmits to the UE the user data which was carried in the transmission that the host computer initiated, in accordance with the teachings of the embodiments described throughout this disclosure. In step 3440 (which may also be optional), the UE executes a client application associated with the host application executed by the host computer.

Figure 25:
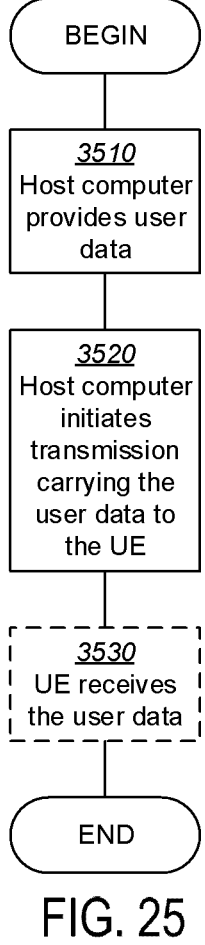
FIG. 25 is a flowchart illustrating a method implemented in a communication system in accordance with some embodiments.

FIG. 25 is a flowchart illustrating a method implemented in a communication system, in accordance with one embodiment. The communication system includes a host computer, a base station and a UE which may be those described with reference to FIGS. 22 and 23. For simplicity of the present disclosure, only drawing references to FIG. 25 will be included in this section. In step 3510 of the method, the host computer provides user data. In an optional substep (not shown) the host computer provides the user data by executing a host application. In step 3520, the host computer initiates a transmission carrying the user data to the UE. The transmission may pass via the base station, in accordance with the teachings of the embodiments described throughout this disclosure. In step 3530 (which may be optional), the LIE receives the user data carried in the transmission.

Figure 26:
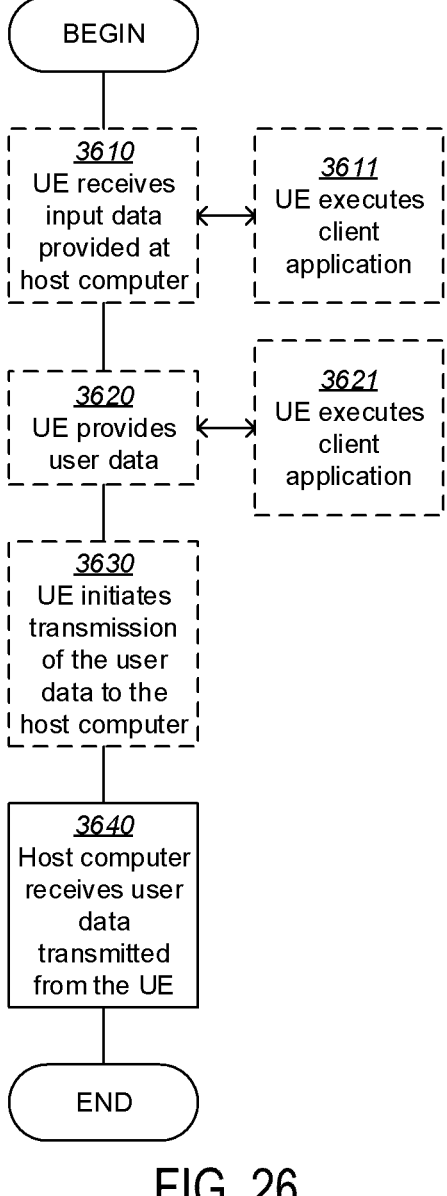
FIG. 26 is a flowchart illustrating a method implemented in a communication system in accordance with some embodiments.

FIG. 26 is a flowchart illustrating a method implemented in a communication system, in accordance with one embodiment. The communication system includes a host computer, a base station and a UE which may be those described with reference to FIGS. 22 and 23. For simplicity of the present disclosure, only drawing references to FIG. 26 will be included in this section. In step 3610 (which may be optional), the UE receives input data provided by the host computer. Additionally or alternatively, in step 3620, the UE provides user data. In substep 3621 (which may be optional) of step 3620, the UE provides the user data by executing a client application. In substep 3611 (which may be optional) of step 3610, the UE executes a client application which provides the user data in reaction to the received input data provided by the host computer. In providing the user data, the executed client application may further consider user input received from the user. Regardless of the specific manner in which the user data was provided, the UE initiates, in substep 3630 (which may be optional), transmission of the user data to the host computer. In step 3640 of the method, the host computer receives the user data transmitted from the UE, in accordance with the teachings of the embodiments described throughout this disclosure.

Figure 27:
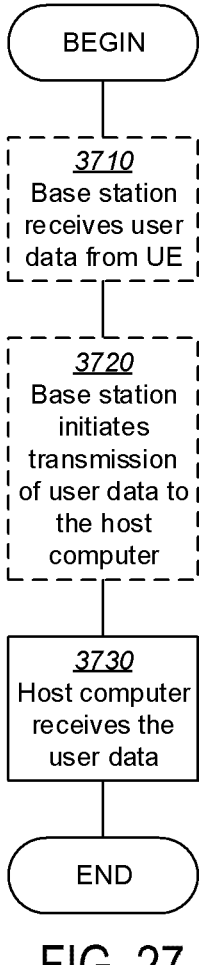
FIG. 27 is a flowchart illustrating a method implemented in a communication system in accordance with some embodiments.

FIG. 27 is a flowchart illustrating a method implemented in a communication system, in accordance with one embodiment. The communication system includes a host computer, a base station and a UE which may be those described with reference to FIGS. 22 and 23. For simplicity of the present disclosure, only drawing references to FIG. 27 will be included in this section. In step 3710 (which may be optional), in accordance with the teachings of the embodiments described throughout this disclosure, the base station receives user data from the UE. In step 3720 (which may be optional), the base station initiates transmission of the received user data to the host computer. In step 3730 (which may be optional), the host computer receives the user data carried in the transmission initiated by the base station.

According to an aspect of the disclosure, there is provided a method implemented in a communication system including a host computer, a first base station and a terminal device. The method comprises, at the host computer, providing user data. The method further comprises, at the host computer, initiating a transmission carrying the user data to the terminal device via a cellular network comprising the first base station. The first base station determines a first spatial distribution of terminal devices in a first cell of the first base station, based on measurement reports which are received from the terminal devices and comprise beam candidates suitable for serving the terminal devices. The first base station determines whether the first cell has a first area whose load needs to be offloaded, based on the first spatial distribution. When determining that the first cell has the first area, The first base station sends, to one or more neighboring base stations, an offload request comprising part of the first spatial distribution corresponding to the first area.

In an embodiment of the disclosure, the method further comprises, at the first base station, transmitting the user data.

In an embodiment of the disclosure, the user data is provided at the host computer by executing a host application. The method further comprises, at the terminal device, executing a client application associated with the host application.

According to another aspect of the disclosure, there is provided a communication system including a host computer comprising processing circuitry configured to provide user data and a communication interface configured to forward the user data to a cellular network for transmission to a terminal device. The cellular network comprises a first base station having a radio interface and processing circuitry. The first base station's processing circuitry is configured to determine a first spatial distribution of terminal devices in a first cell of the first base station, based on measurement reports which are received from the terminal devices and comprise beam candidates suitable for serving the terminal devices. The first base station's processing circuitry is further configured to determine whether the first cell has a first area whose load needs to be offloaded, based on the first spatial distribution. The first base station's processing circuitry is further configured to, when determining that the first cell has the first area, send, to one or more neighboring base stations, an offload request comprising part of the first spatial distribution corresponding to the first area.

In an embodiment of the disclosure, the communication system further includes the first base station.

In an embodiment of the disclosure, the communication system further includes the terminal device. The terminal device is configured to communicate with the first base station.

In an embodiment of the disclosure, the processing circuitry of the host computer is configured to execute a host application, thereby providing the user data. The terminal device comprises processing circuitry configured to execute a client application associated with the host application.

According to yet another aspect of the disclosure, there is provided a method implemented in a communication system including a host computer, a first base station and a terminal device. The method comprises, at the host computer, receiving, from the first base station, user data originating from a transmission which the first base station has received from the terminal device. The first base station determines a first spatial distribution of terminal devices in a first cell of the first base station, based on measurement reports which are received from the terminal devices and comprise beam candidates suitable for serving the terminal devices. The first base station determines whether the first cell has a first area whose load needs to be offloaded, based on the first spatial distribution. When determining that the first cell has the first area, the first base station sends, to one or more neighboring base stations, an offload request comprising part of the first spatial distribution corresponding to the first area.

In an embodiment of the disclosure, the method further comprises, at the first base station, receiving the user data from the terminal device.

In an embodiment of the disclosure, the method further comprises, at the first base station, initiating a transmission of the received user data to the host computer.

According to yet another aspect of the disclosure, there is provided a communication system including a host computer comprising a communication interface configured to receive user data originating from a transmission from a terminal device to a first base station. The first base station comprises a radio interface and processing circuitry. The first base station's processing circuitry is configured to determine a first spatial distribution of terminal devices in a first cell of the first base station, based on measurement reports which are received from the terminal devices and comprise beam candidates suitable for serving the terminal devices. The first base station's processing circuitry is further configured to determine whether the first cell has a first area whose load needs to be offloaded, based on the first spatial distribution. The first base station's processing circuitry is further configured to, when determining that the first cell has the first area, send, to one or more neighboring base stations, an offload request comprising part of the first spatial distribution corresponding to the first area.

In an embodiment of the disclosure, the communication system further includes the first base station.

In an embodiment of the disclosure, the communication system further includes the terminal device. The terminal device is configured to communicate with the first base station.

In an embodiment of the disclosure, the processing circuitry of the host computer is configured to execute a host application. The terminal device is configured to execute a client application associated with the host application, thereby providing the user data to be received by the host computer.

According to yet another aspect of the disclosure, there is provided a method implemented in a communication system including a host computer, a second base station and a terminal device. The method comprises, at the host computer, providing user data. The method further comprises, at the host computer, initiating a transmission carrying the user data to the terminal device via a cellular network comprising the second base station. The second base station determines a second spatial distribution of terminal devices in a second cell of the second base station, based on measurement reports which are received from the terminal devices and comprise beam candidates suitable for serving the terminal devices. The second base station receives, from a first base station neighboring to the second base station, an offload request comprising part of a first spatial distribution corresponding to a first area within a first cell of the first base station. The first spatial distribution is a spatial distribution of terminal devices in the first cell. The second base station obtains a beam mapping between at least some of beams of the second cell and at least some of beams of the first cell. The second base station performs load balance control based on the part of the first spatial distribution, the beam mapping and the second spatial distribution.

In an embodiment of the disclosure, the method further comprises, at the second base station, transmitting the user data.

In an embodiment of the disclosure, the user data is provided at the host computer by executing a host application. The method further comprises, at the terminal device, executing a client application associated with the host application.

According to yet another aspect of the disclosure, there is provided a communication system including a host computer comprising processing circuitry configured to provide user data and a communication interface configured to forward the user data to a cellular network for transmission to a terminal device. The cellular network comprises a second base station having a radio interface and processing circuitry. The second base station's processing circuitry is configured to determine a second spatial distribution of terminal devices in a second cell of the second base station, based on measurement reports which are received from the terminal devices and comprise beam candidates suitable for serving the terminal devices. The second base station's processing circuitry is further configured to receive, from a first base station neighboring to the second base station, an offload request comprising part of a first spatial distribution corresponding to a first area within a first cell of the first base station. The first spatial distribution is a spatial distribution of terminal devices in the first cell. The second base station's processing circuitry is further configured to obtain a beam mapping between at least some of beams of the second cell and at least some of beams of the first cell. The second base station's processing circuitry is further configured to perform load balance control based on the part of the first spatial distribution, the beam mapping and the second spatial distribution.

In an embodiment of the disclosure, the communication system further includes the second base station.

In an embodiment of the disclosure, the communication system further includes the terminal device. The terminal device is configured to communicate with the second base station.

In an embodiment of the disclosure, the processing circuitry of the host computer is configured to execute a host application, thereby providing the user data. The terminal device comprises processing circuitry configured to execute a client application associated with the host application.

According to yet another aspect of the disclosure, there is provided a method implemented in a communication system including a host computer, a second base station and a terminal device. The method comprises, at the host computer, receiving, from the second base station, user data originating from a transmission which the second base station has received from the terminal device. The second base station determines a second spatial distribution of terminal devices in a second cell of the second base station, based on measurement reports which are received from the terminal devices and comprise beam candidates suitable for serving the terminal devices. The second base station receives, from a first base station neighboring to the second base station, an offload request comprising part of a first spatial distribution corresponding to a first area within a first cell of the first base station. The first spatial distribution is a spatial distribution of terminal devices in the first cell. The second base station obtains a beam mapping between at least some of beams of the second cell and at least some of beams of the first cell. The second base station performs load balance control based on the part of the first spatial distribution, the beam mapping and the second spatial distribution.

In an embodiment of the disclosure, the method further comprises, at the second base station, receiving the user data from the terminal device.

In an embodiment of the disclosure, the method further comprises, at the second base station, initiating a transmission of the received user data to the host computer.

According to yet another aspect of the disclosure, there is provided a communication system including a host computer comprising a communication interface configured to receive user data originating from a transmission from a terminal device to a second base station. The second base station comprises a radio interface and processing circuitry. The second base station's processing circuitry is configured to determine a second spatial distribution of terminal devices in a second cell of the second base station, based on measurement reports which are received from the terminal devices and comprise beam candidates suitable for serving the terminal devices. The second base station's processing circuitry is further configured to receive, from a first base station neighboring to the second base station, an offload request comprising part of a first spatial distribution corresponding to a first area within a first cell of the first base station. The first spatial distribution is a spatial distribution of terminal devices in the first cell. The second base station's processing circuitry is further configured to obtain a beam mapping between at least some of beams of the second cell and at least some of beams of the first cell. The second base station's processing circuitry is further configured to perform load balance control based on the part of the first spatial distribution, the beam mapping and the second spatial distribution.

In an embodiment of the disclosure, the communication system further includes the second base station.

In an embodiment of the disclosure, the communication system further includes the terminal device. The terminal device is configured to communicate with the second base station.

In an embodiment of the disclosure, the processing circuitry of the host computer is configured to execute a host application. The terminal device is configured to execute a client application associated with the host application, thereby providing the user data to be received by the host computer.

According to yet another aspect of the disclosure, there is provided a method implemented in a communication system including a host computer, a first base station and a terminal device. The method comprises, at the host computer, providing user data. The method further comprises, at the host computer, initiating a transmission carrying the user data to the terminal device via a cellular network comprising the first base station. The first base station determines a first spatial distribution of terminal devices in a first cell of the first base station, based on measurement reports which are received from the terminal devices and comprise beam candidates suitable for serving the terminal devices. The first base station sends the first spatial distribution to a central control node.

In an embodiment of the disclosure, the method further comprises, at the first base station, transmitting the user data.

In an embodiment of the disclosure, the user data is provided at the host computer by executing a host application. The method further comprises, at the terminal device, executing a client application associated with the host application.

According to yet another aspect of the disclosure, there is provided a communication system including a host computer comprising processing circuitry configured to provide user data and a communication interface configured to forward the user data to a cellular network for transmission to a terminal device. The cellular network comprises a first base station having a radio interface and processing circuitry. The first base station's processing circuitry is configured to determine a first spatial distribution of terminal devices in a first cell of the first base station, based on measurement reports which are received from the terminal devices and comprise beam candidates suitable for serving the terminal devices. The first base station's processing circuitry is further configured to send the first spatial distribution to a central control node.

In an embodiment of the disclosure, the communication system further includes the first base station.

In an embodiment of the disclosure, the communication system further includes the terminal device. The terminal device is configured to communicate with the first base station.

In an embodiment of the disclosure, the processing circuitry of the host computer is configured to execute a host application, thereby providing the user data. The terminal device comprises processing circuitry configured to execute a client application associated with the host application.

According to yet another aspect of the disclosure, there is provided a method implemented in a communication system including a host computer, a first base station and a terminal device. The method comprises, at the host computer, receiving, from the first base station, user data originating from a transmission which the first base station has received from the terminal device. The first base station determines a first spatial distribution of terminal devices in a first cell of the first base station, based on measurement reports which are received from the terminal devices and comprise beam candidates suitable for serving the terminal devices. The first base station sends the first spatial distribution to a central control node.

In an embodiment of the disclosure, the method further comprises, at the first base station, receiving the user data from the terminal device.

In an embodiment of the disclosure, the method further comprises, at the first base station, initiating a transmission of the received user data to the host computer.

According to yet another aspect of the disclosure, there is provided a communication system including a host computer comprising a communication interface configured to receive user data originating from a transmission from a terminal device to a first base station. The first base station comprises a radio interface and processing circuitry. The first base station's processing circuitry is configured to determine a first spatial distribution of terminal devices in a first cell of the first base station, based on measurement reports which are received from the terminal devices and comprise beam candidates suitable for serving the terminal devices. The first base station's processing circuitry is further configured to send the first spatial distribution to a central control node.

In an embodiment of the disclosure, the communication system further includes the first base station.

In an embodiment of the disclosure, the communication system further includes the terminal device. The terminal device is configured to communicate with the first base station.

In an embodiment of the disclosure, the processing circuitry of the host computer is configured to execute a host application. The terminal device is configured to execute a client application associated with the host application, thereby providing the user data to be received by the host computer.

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the disclosure is not limited thereto. While various aspects of the exemplary embodiments of this disclosure may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As such, it should be appreciated that at least some aspects of the exemplary embodiments of the disclosure may be practiced in various components such as integrated circuit chips and modules. It should thus be appreciated that the exemplary embodiments of this disclosure may be realized in an apparatus that is embodied as an integrated circuit, where the integrated circuit may comprise circuitry (as well as possibly firmware) for embodying at least one or more of a data processor, a digital signal processor, baseband circuitry and radio frequency circuitry that are configurable so as to operate in accordance with the exemplary embodiments of this disclosure.

It should be appreciated that at least some aspects of the exemplary embodiments of the disclosure may be embodied in computer-executable instructions, such as in one or more program modules, executed by one or more computers or other devices. Generally, program modules include routines, programs, objects, components, data structures, etc. that perform particular tasks or implement particular abstract data types when executed by a processor in a computer or other device. The computer executable instructions may be stored on a computer readable medium such as a hard disk, optical disk, removable storage media, solid state memory, RAM, etc. As will be appreciated by one skilled in the art, the function of the program modules may be combined or distributed as desired in various embodiments. In addition, the function may be embodied in whole or in part in firmware or hardware equivalents such as integrated circuits, field programmable gate arrays (FPGA), and the like.

References in the present disclosure to "one embodiment", "an embodiment" and so on, indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether or not explicitly described.

It should be understood that, although the terms "first", "second" and so on may be used herein to describe various elements, these elements should not be limited by these terms. These terms are only used to distinguish one element from another. For example, a first element could be termed a second element, and similarly, a second element could be termed a first element, without departing from the scope of the disclosure. As used herein, the term "and/or" includes any and all combinations of one or more of the associated listed terms.

The terminology used herein is for the purpose of describing particular embodiments only and is not intended to limit the present disclosure. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components, but do not preclude the presence or addition of one or more other features, elements, components and/or combinations thereof. The terms "connect", "connects", "connecting" and/or "connected" used herein cover the direct and/or indirect connection between two elements.

The present disclosure includes any novel feature or combination of features disclosed herein either explicitly or any generalization thereof. Various modifications and adaptations to the foregoing exemplary embodiments of this disclosure may become apparent to those skilled in the relevant arts in view of the foregoing description, when read in conjunction with the accompanying drawings. However, any and all modifications will still fall within the scope of the non-Limiting and exemplary embodiments of this disclosure.

What is claimed is:

1. A method in a first base station, the method comprising: determining a first spatial distribution of terminal devices in a first cell of the first base station, based on measurement reports which are received from the terminal devices and which comprise beam candidates suitable for serving the terminal devices, wherein the beam candidates are divided within a certain sliding time window, and wherein after one sliding time window has elapsed, beam candidates reported by terminal devices in the first cell are reevaluated within next sliding time window;

determining whether the first cell has a first area whose load needs to be offloaded, based on the first spatial distribution; and when determining that the first cell has the first area, sending, to one or more neighboring base stations, an offload request comprising part of the first spatial distribution corresponding to the first area.

2. The method according to claim 1, further comprising:

receiving, from a second base station of the one or more neighboring base stations, an offload response indicating that some of the load of the first area can be offloaded to a second cell of the second base station; and initiating, for at least one terminal device in the first area, a handover from the first cell to the second cell.

3. The method according to claim 1, wherein the determining the first spatial distribution comprises dividing the beam candidates into multiple groups based on directions of the beam candidates, wherein the multiple groups act as the first spatial distribution.

4. The method according to claim 1, wherein the first cell is determined to have the first area when a distribution density in the first area is above a first predetermined threshold.

5. The method according to claim 1, wherein the measurement reports further comprise signal qualities over the beam candidates, and wherein whether the first cell has the first area is determined based further on the signal qualities.

6. The method according to claim 5, wherein the first cell is determined to have the first area when a distribution density in the first area is above a first predetermined threshold and a statistical value of the signal qualities in the first area is above a second predetermined threshold.

* * * * *